United States Patent
Dowdle et al.

(10) Patent No.: US 6,693,592 B2
(45) Date of Patent: Feb. 17, 2004

(54) GEOGRAPHICAL NAVIGATION USING MULTIPATH WIRELESS NAVIGATION SIGNALS

(75) Inventors: John R. Dowdle, Arlington, MA (US); Donald E. Gustafson, Lexington, MA (US); John M. Elwell, Jr., Sudbury, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 95 days.

(21) Appl. No.: 10/027,851

(22) Filed: Dec. 21, 2001

(65) Prior Publication Data

US 2002/0089450 A1 Jul. 11, 2002

Related U.S. Application Data

(60) Provisional application No. 60/258,066, filed on Dec. 22, 2000.

(51) Int. Cl.[7] .................................................. G01S 3/02
(52) U.S. Cl. ........................................................ 342/453
(58) Field of Search ........................... 342/357.06, 453; 701/213; 455/456.1

(56) References Cited

U.S. PATENT DOCUMENTS

| | | | |
|---|---|---|---|
| 3,537,008 A | 10/1970 | Lakatos | 325/65 |
| 3,869,673 A | 3/1975 | Close | 325/393 |
| 4,675,880 A | 6/1987 | Davarian | 375/39 |
| 4,812,991 A | 3/1989 | Hatch | 364/458 |
| 5,296,861 A | 3/1994 | Knight | 342/357 |
| 5,347,286 A | 9/1994 | Babitch | 342/359 |
| 5,414,729 A | 5/1995 | Fenton | 375/209 |
| 5,590,043 A | 12/1996 | McBurney | 364/449.1 |
| 5,606,732 A | 2/1997 | Vignone, Sr. | 455/269 |
| 5,630,208 A | 5/1997 | Enge et al. | 455/65 |
| 5,646,964 A | 7/1997 | Ushirokawa et al. | 375/346 |
| 5,689,431 A | 11/1997 | Rudow et al. | 364/449.7 |
| 5,710,977 A | 1/1998 | Nakazawa | 455/65 |
| 5,726,659 A | 3/1998 | Kee et al. | 342/352 |
| 5,740,049 A | 4/1998 | Kaise | 364/450 |
| 5,745,075 A | 4/1998 | Enge et al. | 342/367 |
| 5,760,909 A | 6/1998 | Nichols | 356/4.08 |
| 5,771,456 A | 6/1998 | Pon | 455/456 |
| 5,796,773 A | 8/1998 | Sheynblat | 375/200 |
| 5,815,539 A | 9/1998 | Lennen | 375/371 |
| 5,828,694 A | 10/1998 | Schipper | 375/208 |
| 5,883,595 A | 3/1999 | Colley | 342/357 |
| 5,883,817 A | 3/1999 | Chisholm et al. | 364/578 |
| 5,903,597 A | 5/1999 | Pon | 375/209 |
| 5,917,445 A | 6/1999 | Schipper et al. | 342/357 |
| 5,918,161 A | 6/1999 | Kumar et al. | 455/65 |
| 5,926,113 A | 7/1999 | Jones et al. | 340/906 |
| 5,926,133 A | 7/1999 | Green, Jr. | 342/363 |
| 5,936,573 A | 8/1999 | Smith | 342/357 |
| 5,950,140 A | 9/1999 | Smith | 702/2 |
| 5,963,601 A | 10/1999 | Pon et al. | 375/346 |
| 5,986,575 A | 11/1999 | Jones et al. | 340/906 |
| 5,991,345 A | 11/1999 | Ramasastry | 375/347 |
| 6,002,361 A | * 12/1999 | Schipper | 342/453 |
| 6,026,304 A | 2/2000 | Hilsenrath et al. | 455/456 |
| 6,031,601 A | 2/2000 | McCusker et al. | 356/5.01 |
| 6,031,881 A | * 2/2000 | Weill et al. | 375/341 |
| 6,078,788 A | 6/2000 | Haardt | 455/65 |
| 6,084,927 A | 7/2000 | Pon | 375/343 |
| 6,114,989 A | 9/2000 | Fontes et al. | 342/357.06 |
| 6,198,765 B1 | 3/2001 | Cahn et al. | 375/142 |
| 6,259,401 B1 | * 7/2001 | Woo | 342/357.12 |
| 6,541,950 B2 | * 4/2003 | Townsend et al. | 455/456 |

\* cited by examiner

*Primary Examiner*—Theodore M. Blum
(74) *Attorney, Agent, or Firm*—Testa, Hurwitz & Thibeault, LLP

(57) ABSTRACT

A wireless navigational system and process utilize multipath wireless signals normally discarded from the navigation solution to enhance navigational performance under a range of operational scenarios. A relationship between the receiver's location and one or more multipath signals is established, facilitating subsequent navigation using the multipath signal(s).

31 Claims, 15 Drawing Sheets

GEOGRAPHICAL NAVIGATION USING MULTIPATH WIRELESS NAVIGATION SIGNALS

RELATED APPLICATIONS

This application claims the benefits of U.S. Provisional Application Serial No. 60/258,066, filed on Dec. 22, 2000, the entirety of which is hereby incorporated by reference.

FIELD OF THE INVENTION

The invention relates generally to wireless navigation and more particularly to radio navigation using, for example, the Global Positioning System (GPS).

BACKGROUND OF THE INVENTION

Recent technological developments combined with the economic advantages of mass production have resulted in the proliferation of small, lightweight navigational receivers capable of accurately determining a user's position, distance, and bearing using wireless broadcast signals. One particularly important example of such a wireless receiver operates using a navigational system known as the Global Positioning System (GPS).

Developed initially for military applications, the GPS includes a space segment of orbiting satellites, each broadcasting a wireless navigation signal. GPS includes a sufficient number of satellites, configured as a constellation, to provide global coverage. GPS presently enables numerous applications ranging from automobile navigation to retrieval of stolen cars to precisely guiding munitions to their targets.

Conventional GPS navigational receivers can provide precise location information under certain operational conditions by receiving and processing the navigational signals from a sufficient number of the GPS satellites. The GPS system is a range-based navigational system whereby a receiver's geographical position is uniquely determined by independent range measurements to a sufficient number of GPS satellites. The GPS receiver determines its location from the measured range to each satellite, the satellite's identity, and its location. The radio-frequency (RF) navigational signal broadcast by each of the GPS satellites is modulated with a unique code (a series of 1's and 0's that repeats over a long period in relation to the data rate). The navigational signal of each satellite also periodically broadcasts information identifying its approximate position (e.g., the satellite's ephemeris data).

The range represents the straight-line distance (e.g., in meters) between the receiver and the satellite. The range is generally calculated by measuring a propagation delay (i.e., the time it takes for the signal to propagate from the satellite to the receiver) associated with the received navigational signal. The receiver then typically determines the range as the product of the measured propagation delay and an assumed propagation velocity. For example, the propagation velocity is generally known for the particular geometry of the radio-frequency (RF) path. The propagation velocity would be the speed of light in a vacuum if the path were, in fact, through a vacuum; however, the propagation velocity is typically a lesser (but approximately determinable) value due to the effect of the earth's atmosphere.

Generally, GPS receivers are designed to operate with more than the minimum number of satellites "in view" (i.e., in direct line-of-sight) of the receiver that would be necessary to support a full navigation solution. For example, range measurements at the receiver to three GPS satellites would indicate the receiver's location at either of two points on the earth's surface. Range measurements to additional satellites would increase the accuracy of the determined position. Conversely, blockage of the direct path to one or more of the satellites (e.g., obstruction of the direct, or line-of-sight, path by mountains or buildings) may compromise the receiver's ability to determine and maintain awareness of its position, particularly where the blockage results in position determination using a lesser number of satellites than minimally required.

GPS receivers must also deal with reflections of the navigation signals originating from one or more of the satellites. For example, obstacles such as buildings can block the direct path between the receiver and satellite, so the signal reaching the receiver is a result of one or more reflections. These RF reflections are commonly referred to as "multipath" signals. Where the GPS receiver is able to receive a direct-path signal, the multipath signals represent unwanted noise, or interference. Some GPS receivers are able to discard the multipath under certain conditions. But when the GPS receiver receives one or more multipath signals yet is unable to maintain direct-path communications, the receiver may inadvertently process the multipath as though it were the direct path signal, resulting in erroneous range measurements. Of course, even if the erroneous ranges resulting from the multipath are identified and discarded, the absence of a usable navigational signal precludes position determination.

Unfortunately, many areas where GPS receivers operate (e.g., urban environments) inevitably result in both blockage of the direct paths and the occurrence of multipath signals. Some prior-art GPS receivers have been designed to "coast" (i.e., refrain from further position computation) when fewer than the full number of satellites are in view, while other prior-art receivers utilize navigational information from other sources in the absence of a sufficient number of direct-path satellite signals. However, GPS receivers are generally unable to maintain their accuracy while coasting, and solutions relying on other navigational systems can be costly and more complex, thus defeating the objective of providing a small, light-weight, and inexpensive system.

SUMMARY OF THE INVENTION

In general, the present invention relates to wireless navigational systems, such as GPS, that utilize multipath wireless signals normally discarded from the navigation solution to enhance a navigational system's performance under a range of operational scenarios. The navigational system may provide solutions where direct paths between a transmitter, such as a satellite, and a receiver become obscured, or blocked. The present invention may also be used in conjunction with other navigational techniques to provide a more robust navigational capability.

Accordingly, in a first aspect, the invention relates to a process for navigating using a multipath wireless signal whereby a receiver receives navigational information indicative of a geographical location. The receiver also receives a multipath navigation signal, which the receiver relates to the reliably computed geographical location. Having determined the relationship, the receiver is able to perform navigation using the multipath signal and the predetermined relationship between the multipath signal and the geographic location.

In one embodiment the receiver receives navigational information by way of a direct-path wireless signal. The receiver computes a geographic location and relates a multipath navigation signal to the geographical location by correlating the multipath signal with the direct-path signal. In some embodiments an offset coefficient relating the multipath signal to the direct-path signal is determined, whereby processing the offset coefficient with the multipath signal facilitates the determination of a current location.

In another embodiment the step of determining a path delay comprises the steps of time-shifting a replica of a received signal, correlating the received signal with the time-shifted replica thereof, and determining a time-shift value resulting in a relative maximum correlation of the received signal with the time-shifted stored representation of the received signal.

In another embodiment wherein at least one of the multipath signal and the direct-path signal is of insufficient strength to permit navigation based thereon, the navigation step includes combining the multipath signal and the direct-path signal to provide a navigation solution.

In yet another embodiment the current location is determined by a wireless multipath signal generated by a GPS transmitter. In other embodiments the current location is provided by another navigational system, such as an inertial navigational system. In yet other embodiments, the current location is provided by a known starting location, such as map coordinates.

In another aspect, the invention relates to an apparatus for navigating using a multipath wireless signal. The apparatus includes circuitry for providing a geographical location, a receiver for receiving a wireless multipath navigation signal, circuitry for relating the multipath signal to the geographical location, and circuitry for navigating using the multipath navigation signal based on the relationship.

In some embodiments the receiver includes circuitry configured to receive a spread-spectrum signal, such as a code-division multiple-access (CDMA) signal. In one embodiment the receiver is configured to receive the wireless multipath navigation signal from a GPS transmitter.

In one embodiment the relating circuitry comprises a correlator interactive with the geographic location circuitry and the receiver. The correlator provides an output indicative of a relationship between the geographic location and the received wireless multipath navigation signal. In some embodiments, the correlator may be part of a tracking loop filter that provides an indication of the delay.

In another embodiment the navigating circuitry includes a processor in communication with the relating circuitry. The processor processes an output signal received from the relating circuitry; the output signal relates the multipath navigation signal to the current geographic location. Based on the relationship between the multipath navigation signal and the current geographic location, the processor determines a current location using the wireless multipath navigation signal.

In another embodiment the relating circuitry includes circuitry for determining a first path delay corresponding to a direct-path range. The relating circuitry also includes circuitry for similarly determining a second path delay corresponding to a multipath range. Having determined the direct path delay and multipath delay(s), the circuitry determines an offset coefficient relating the first path delay to the second path delay.

In another embodiment the circuitry for determining the first and second path delays time-shifts a stored representation of a received signal. The circuitry correlates the received signal with the time-shifted stored representation thereof, and determines a time-shift value corresponding to a relative maximum correlation. In some embodiments the delay device includes a shift register. In other embodiments the delay device includes a tapped-delay line.

In another embodiment, where the amplitude of at least one of the received multipath signal and the received direct-path signal is insufficient to facilitate navigation, the navigational circuitry includes circuitry that combines the received signals to provide a navigation solution.

In yet another embodiment the geographical-location circuitry is configured to determine the geographical location from a known starting location and an estimate of a current location based on the starting location.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Multipath Wireless Navigation

Figure 1:
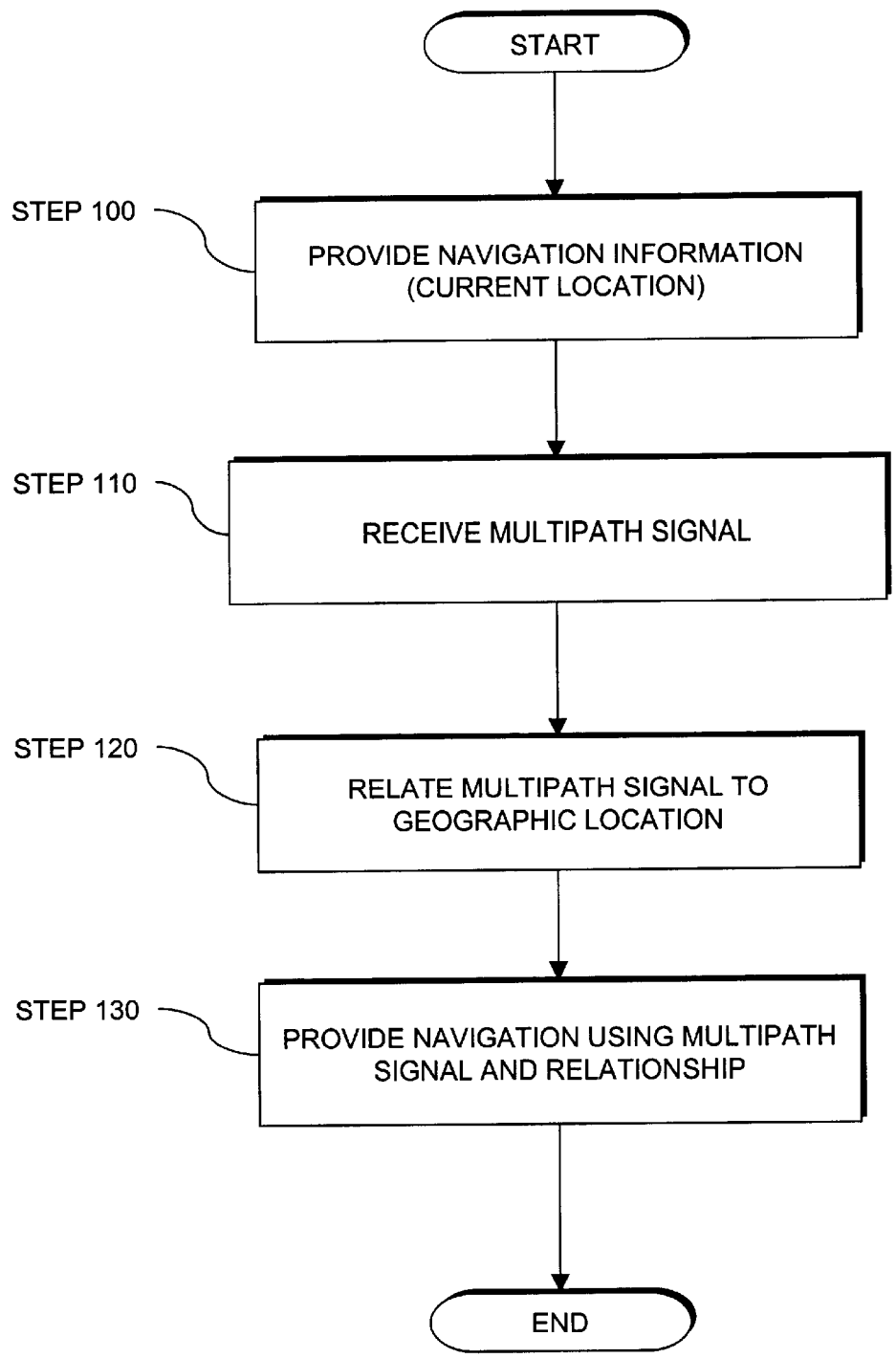
FIG. 1 is a flow diagram depicting one embodiment of the invention.

In one embodiment, illustrated in FIG. 1, a process for navigating using a multipath wireless signal begins with navigational information indicative of a current location (step 100). If the process is implemented within a wireless navigational receiver, the navigational information relates to the receiver's location. The navigational information may be a set of geographical coordinates corresponding to the receiver's location (e.g., latitude, longitude and altitude), a range, an azimuth and an elevation to a known reference position, or a street address, or other reference position in relation to a map. In one embodiment the receiver's current location information may be determined by the receiver itself. For example, a GPS receiver typically determines its location by receiving a navigation signal from a sufficient number of GPS satellites (alternatively, navigational information may be received from GPS pseudolites (ground-based navigational sources transmitting the GPS navigation signal), or other satellite navigation systems, such as GLO-NASS. The GPS receiver typically determines its range to one or more of the GPS satellites by determining the transit delay experienced by the received signal during its propagation along a direct path from the satellite to the receiver—the line-of-sight (LOS) path.

The process also includes receiving a wireless multipath signal (step 110). The multipath signal is transmitted by a navigational source and characterized by having propagated along a path other than the direct path. The multipath signal may result from reflections of the transmitted navigational signal occurring anywhere along the signal path from the navigational source to the receiver. For terrestrial GPS receivers, the reflections generally result from structures located in the general proximity of the receiver (e.g., buildings and other man-made structures, the ground, including hills and other terrain features, and other reflectors, such as vehicles). In general, the multipath signal may be any wireless signal capable of carrying information, such as a radio-frequency (RF) signal (e.g., low frequency, high frequency, microwave, millimeter wave); an optical signal (e.g., infrared, visible, ultraviolet); or a pressure-wave signal (e.g., sonic, ultrasonic).

The process further includes relating the multipath signal to the geographic location (step 120). In one sense, determining the relationship is similar to performing a calibration. In general, calibration involves measuring a known quantity, observing the measurement result, defining the measurement result to be the value of the known quantity, and determining one or more measurement offset values, or correction factor(s), that when applied to future measurement results, yields the appropriate value of the measured quantity.

For example, in one embodiment, the relative position, range, or navigation solution of the receiver's location may be determined by obtaining a solution using the multipath signal as though it were a direct-path signal. That is, the receiver determines the multipath ranges to the navigational source, or distance traveled along the reflected multipath from the navigational source to the receiver. Without a correction the multipath solution would yield an erroneous navigation solution. Having been provided the current location, however, the receiver determines the straight-line range from the receiver to the navigational source. The receiver then relates the multipath range to the actual direct path range.

Once the relationship between the multipath signal and the provided location has been determined, navigation is performed using the multipath signal and the predetermined relationship (step 130). Thus, the receiver may receive the multipath signal from the navigational source without necessarily having received the direct-path signal. The receiver ascertains its location by acquiring the multipath range and modifying that range based on the determined relationship. The relationship determined during periods when the direct-path and multipath signals are both observable may be used to navigate during periods when the direct-path signal is not observable. The relationship may be periodically updated when the direct-path and the multipath signals are once again observable.

Figure 2:
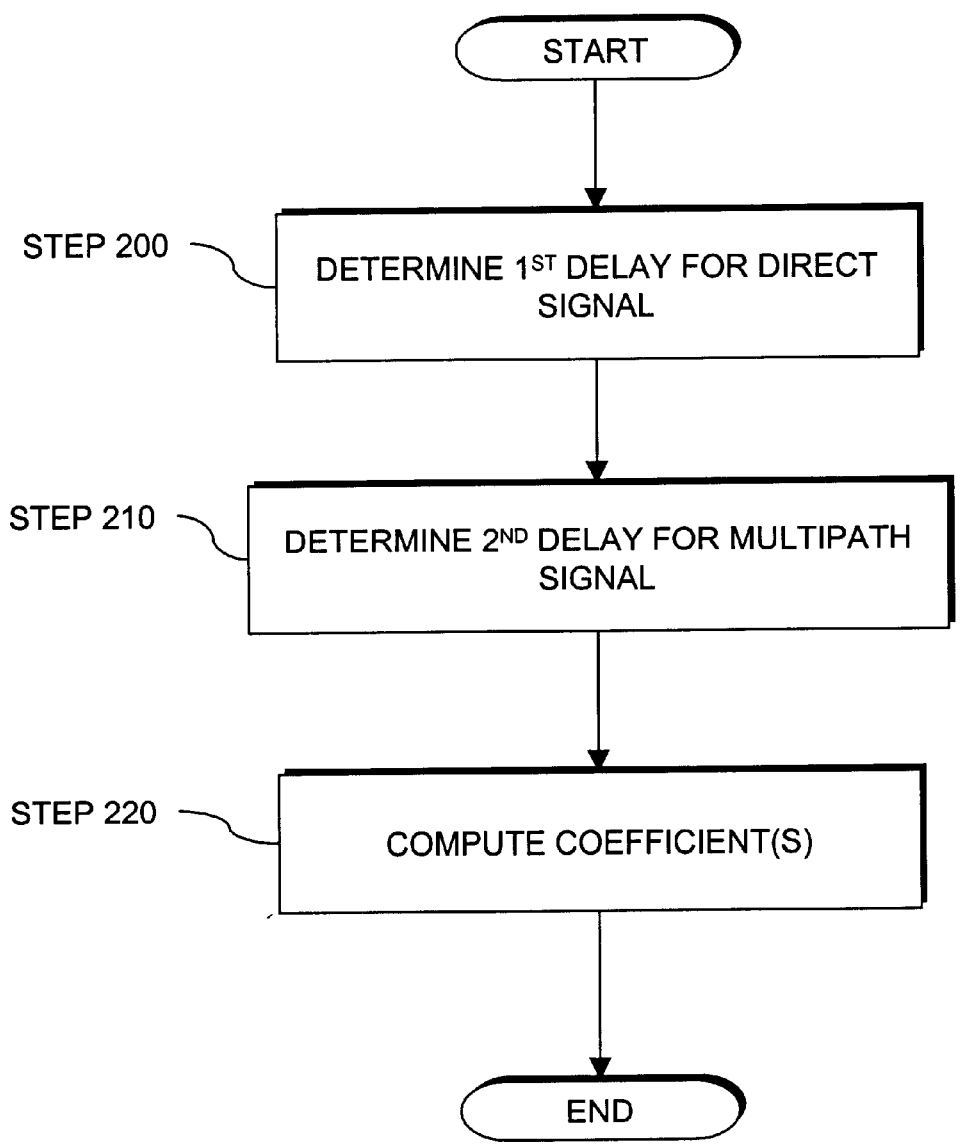
FIG. 2 is a flow diagram depicting, in more detail, one embodiment relating to the invention shown in FIG. 1.

As shown in FIG. 2, the step of relating the received multipath signal to its provided current location may include determining a first delay for a direct-path wireless signal (step 200). In a receiver system, such as a GPS receiver performing range-based calculations, the delay for the direct-path signal is generally determined by measuring the transit time of the signal. Where the receiver and navigational sources are substantially synchronized to the same timing source and the source transmits the signal according to a predetermined schedule, the receiver may determine the transit time, for example, by initiating a timer at the time of transmission and terminating the timer upon receipt of the transmitted signal. In this manner, the resulting timer value represents the delay attributable to the transit time of the transmitted signal. Alternatively, the receiver may measure the time at which the signal was received, determine at which time the received signal was transmitted (e.g., using a look-up table) and calculate the delay as the difference between the two times. In either case, the receiver performs a similar time-delay/transit-time measurement for the multipath signal, yielding a second delay (step 210). Having the first time delay corresponding to the direct path and the second time delay corresponding to the multipath, the receiver calculates correction factors. When the correction factors are applied to the second time delay, navigation may thus be performed as if the receiver had received the direct-path signal at the first time delay.

Modifications to the above-described process may be implemented to accommodate situations in which the receiver and the source are not precisely synchronized. For example, where multiple sources are synchronized to each other (e.g., GPS satellites), techniques are available and well known to those of ordinary skill in the art to resolve the time ambiguity between the source(s) and a receiver to allow for operation as if the source(s) and receiver were synchronized. For example, receipt of navigational signals from a greater number of sources than required to determine position may be used to resolve the time ambiguity.

In one embodiment, a range-based navigational receiver, such as a GPS receiver, receives a navigational signal transmitted from a wireless navigational source. The navigational signal is periodically transmitted from the wireless navigational source at a predetermined first time. The receiver receives the transmitted navigational signal at a second time and computes, from the difference between the first and second times, the transit delay incurred during propagation from the source to the receiver. Because the satellite broadcasts the signal repeatedly, measuring the delay requires associating the received signal with the corresponding transmitted signal. To differentiate among transmissions and facilitate identification of a particular transmission, the satellite may modulate each transmission with a different code sequence, each of which is associated with a different, identifiable transmission time. With the receiver and the transmitter operating with reference to the same signal and substantially the same time, the receiver may measure the delay by subtracting the actual reception from the known (or determined) transmission time. In this way, a delay may be determined for each received direct-path and multipath signal associated with a particular transmission.

Having determined the first and second delays, the receiver may compute one or more multipath parameters relating the first and second delays (step 220) for each received multipath signal. The multipath parameter(s) may be determined, for example, as an offset coefficient by dividing the direct-path delay by the multipath delay. Having computed the multipath parameters, the receiver may determine its range to the navigational source by measuring the multipath delay, correcting that delay by using the multipath parameter(s) to compute the effective direct-path delay, then multiplying the effective direct-path delay by the velocity of propagation to determine an estimate of the range from the receiver to the source. Where this process is employed for a sufficient number of sources, each source being located at a predetermined position and corresponding to one or more multipath signals, the receiver may navigate using, for example, standard navigational techniques of triangulation.

Where more than one multipath signal is received from the same source, e.g., due to the same signal following multiple reflection paths, the receiver determines a separate set of multipath parameters for each of the multipath signals. The receiver may optionally be configured to process the multiple sets of multipath parameters to confirm and/or improve the accuracy of the range determination. For example, in confirming the accuracy of the range determination, the receiver may separately determine the range according to the multipath parameters associated with each multipath signal, declaring a valid solution where the variations among the range solutions fall within a predetermined error margin. Conversely, the receiver may declare an invalid solution where the variations among the range solutions fall outside a predetermined error margin. In improving the accuracy of the range determination, the receiver may further process the separately determined ranges. For example, the receiver may determine its range as the average of the individual ranges determined using the different sets of multipath parameters. Different statistical techniques may also be employed in processing the separately-determined ranges, such as eliminating the shortest and longest ranges or "outliers" deviating excessively from the mean, and averaging the remaining ranges.

GPS Embodiment

Figure 3:
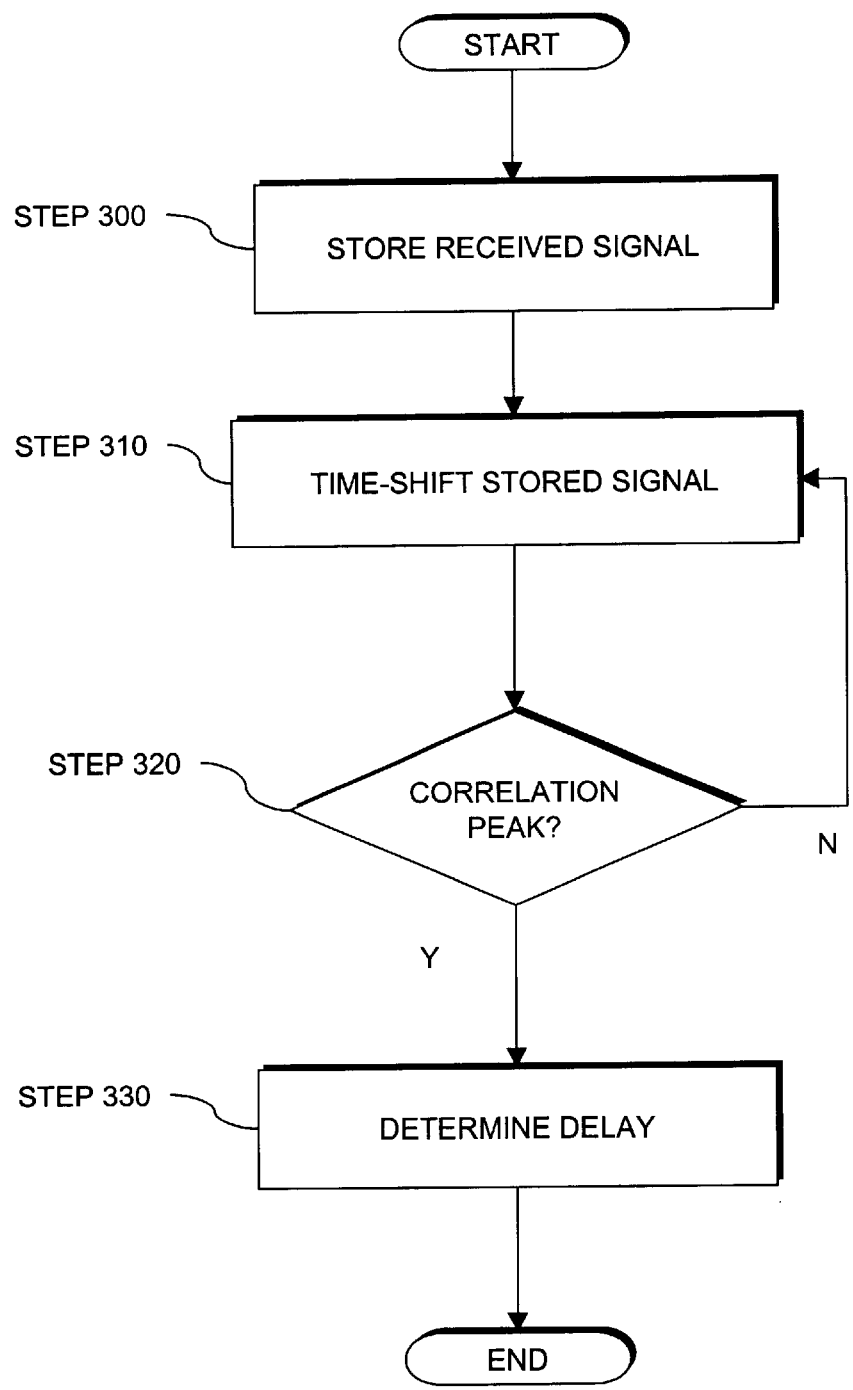
FIG. 3 is a flow diagram depicting, in more detail, an alternative embodiment relating to the invention shown in FIG. 1.

Referring to FIG. 3, the process for determining the time delay of the received navigational signal may include providing a stored representation of the received signal (step 300). In one embodiment, the stored representation is a fixed-length sequence of binary digits, or bits. The bit sequence may be associated with a particular source and helps to differentiate that source from similar sources. In some embodiments, the sequence of bits is determinable according to a pre-defined algorithm that may depend, for example, on the time of generation and/or the previous bit sequence(s). Some navigational sources, such as GPS satellites, periodically transmit such a predetermined (or determinable) sequence of bits referred to as a pseudo-random-noise (PRN) code. For example, in a GPS system, the sequence of bits may correspond to either the "C/A" code, or the "P(Y)" code. The navigational source typically transmits at predetermined time intervals a wireless signal modulated with the appropriate PRN code bits. The wireless navigational receiver receives the modulated wireless signal which may include a direct path signal component, one or more multipath components, or a combination of the direct path and one or more multipath wireless signal components. The receiver conditions the received wireless signal as necessary to obtain the sequence of bits for comparison. Receiver conditioning may include down-conversion, or frequency translation (e.g., from a RF carrier frequency to a lower, intermediate, or even baseband frequency) and detection, or demodulation.

With the received sequence of bits and a locally stored representation of the same sequence of bits, the receiver determines the delay by delaying the stored representation by a first delay estimate (step 310) and performing a correlation of the received signal with the delayed version of the locally stored representation (step 320). Generally, the time shift and correlation (steps 310 and 320) represent a matched filter being applied to the received signal. In one embodiment, the correlation includes an integration of the product of the received signal and the delayed representation. Where the two signals match, the correlation process will yield a relative, or absolute maximum result. Careful selection of the sequence of bits ensures that the maximum correlation occurs only where the correlated signals are substantially identical. The delay estimate may be increased if, for example, there is no correlation between the two signals, and the process of time shifting to the revised delay value (step 310) and correlating (step 320) are repeated. When the receiver detects correlation of the two signals, the receiver may determine the time delay associated with the received signal (step 330). Ordinarily, this time delay is the delay estimate used to offset the locally stored signal representation.

In one embodiment, such as a GPS receiver operating on a direct-sequence, PRN, spread-spectrum signal, correlation of the received signal with the locally-stored signal in effect de-spreads the spreading applied by the PRN code and yields the underlying navigational information. Where the received signal includes the direct-path signal and one or more related multipath signals, correlations are typically observed for the direct-path and each of observable multipath signals. As the transit delay of the direct-path signal is necessarily shorter than that of any of the multipath signals, the direct-path signal is typically identifiable as being received prior to any multipath signal. Thus, the direct-path correlation is typically observed with a delay value less than the delay value associated with the multipath signal(s). In some embodiments, the largest delay value employed by the receiver is selected as a sufficiently large value to include all anticipated observable multipath signals.

Figure 4A:
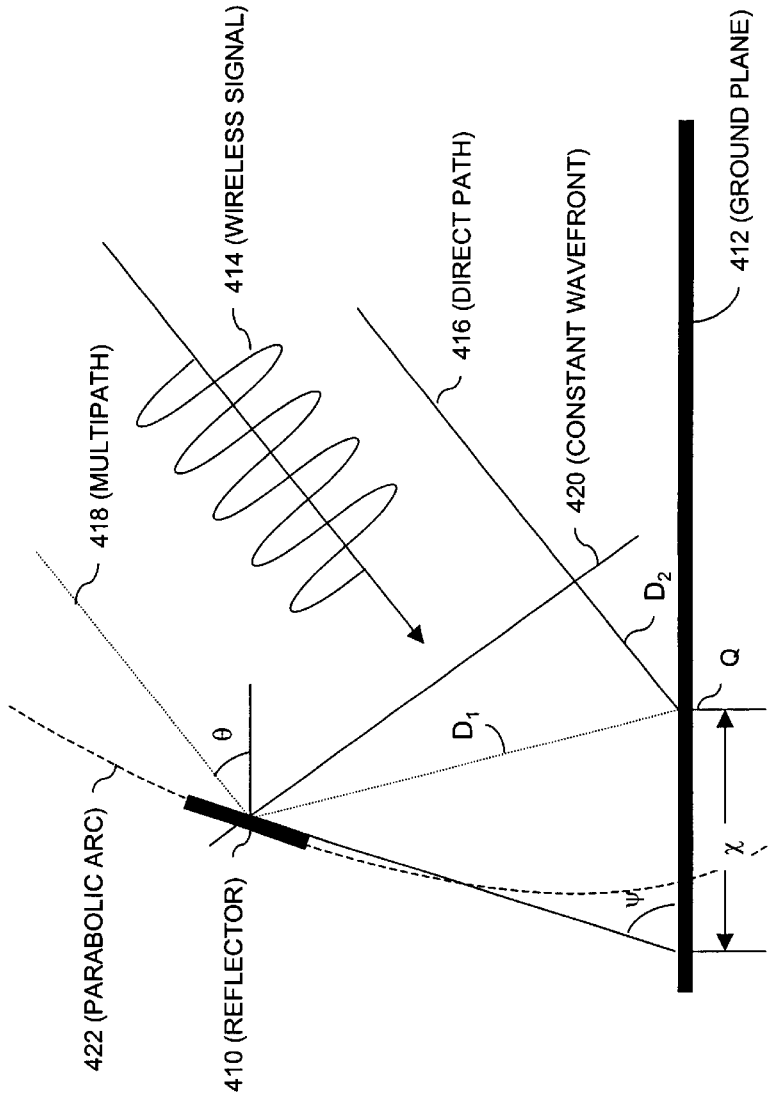
FIG. 4A is a schematic representation of a two-dimensional geometry relating to the invention shown in FIG. 1.

Referring to FIG. 4A, an exemplary geometry for a receiver receiving a direct signal and a single multipath is shown in two dimensions. The geometry includes a reflector 410 and a ground plane 412, where the axis of the reflector and the axis of the ground plane define an angle $\psi$. A wireless signal 414, such as an electromagnetic plane wave, propagates from a source (not shown) toward a receiver located at point Q. Also shown are a direct path 416 represented by a solid line, or ray, from the source to the receiver, and a multipath 418 represented by a dotted line from the same source to the receiver, the multipath 418 including a reflection at the reflector 410. For reference, a constant wavefront 420 is identified by a line drawn between common reference points on each of the direct path 416 and the multipath 418. Where the wireless signal 414 is an electromagnetic plane wave, the common reference points represent equi-phase points residing along a common wavefront. Further defining the geometry are the distance $\chi$ from the reflector 410 to the receiver location Q, the distance $D_1$ from the point of reflection to the receiver, and the distance $D_2$ along the direct path from the receiver to the identified equi-phase point.

Angle $\theta$ is the satellite elevation angle measured from local horizontal to the satellite. Accordingly, the relationship between the direct path and the multipath may be determined by first determining a direct-path parameter $g_0$ as $$g_0 = -\frac{\cos 2\theta}{\cos \theta}. \tag{1}$$

The value $g_0$ is known, or determinable, for a receiver at a known location. The indirect path parameter $g_1$ may then be determined as $$g_1 = -\frac{1}{\cos \theta} \tag{2}$$

which is typically unknown. The delay $\tau_0$ along the direct path is determined using the direct-path parameter $g_0$ as $$\tau_0 = g_0 \chi + \tau_{ref} \tag{3}$$

and the delay on the indirect path $\tau_1$ is determined using the indirect path, or multipath, parameter $g_1$ as $$\tau_1 = g_1 \chi + \tau_{ref} \tag{4}$$

where $g_1 d$ is the propagation delay along the distance to the reflecting obstacle and $\tau_{ref}$ is a reference delay which is a function of elevation angle and distance to the satellite. The results are independent of $\tau_{ref}$.

In general, a process of determining multipath solutions may be distinguished from a process of obtaining navigation solutions. Multipath solutions arise from the geometry of the multipath and may be obtained from known configurations in which the positions of a wireless source and a receiver are known, as well as the locations and orientations of all reflecting planes, to a sufficient degree of specificity. Multipath solutions generally contain information indicative of the length of the indirect path segments from the wireless source to the locations of the points of reflection. The length of the indirect path segments may also be represented by a path-delay measurement, corresponding to the propagation delay associated with a wireless signal propagating along the individual path segments comprising the multipath. In contrast, navigation solutions estimate the receiver position from a series of indirect and direct path delay measurements. As a result, navigation solutions can function without requiring estimates of all of the multipath variables, but only a subset of them.

Multipath Solution for One Reflection

Figure 4B:
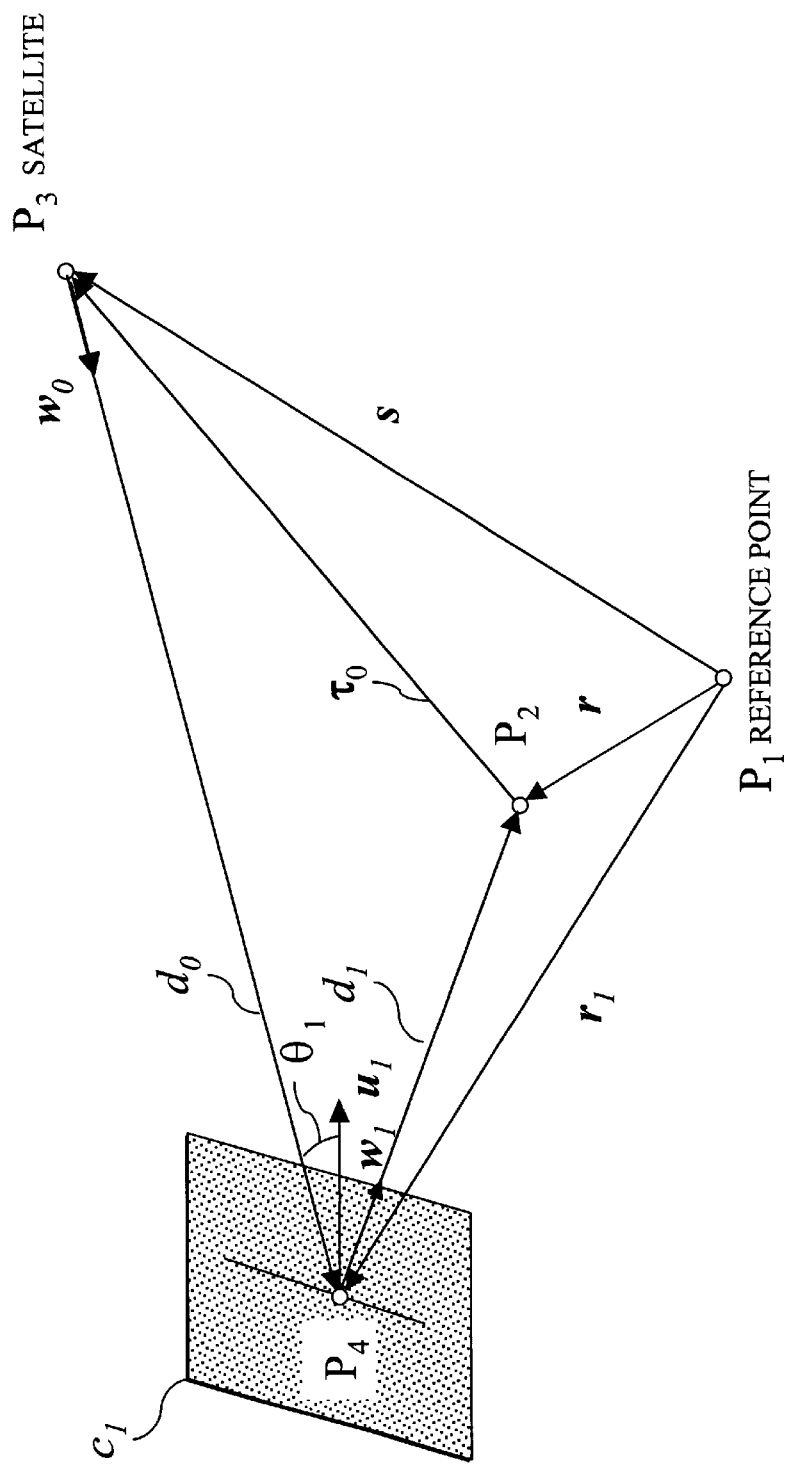
FIG. 4B is a schematic representation of a generalized three-dimensional geometry having a single reflection.

FIG. 4B illustrates a generalized three-dimensional multipath geometry having a single specular reflection. A specular reflection is used for illustrative purposes and in no way limits operation of the multipath navigational receiver to geometries having only specular reflections. Point $P_1$ represents a reference location in the general vicinity of the receiver located at point $P_2$. The reference location $P_1$ may be designated as the origin of a coordinate system such as a Cartesian or a spherical coordinate system. A vector $r$ identifies the receiver location $P_2$ with respect to the reference location $P_1$. Point $P_3$ represents the location of a wireless navigational source, such as a satellite, and a vector $s$ identifies the satellite location $P_3$ with respect to the reference location $P_1$. Point $P_4$ represents the location of the point of reflection on the reflecting surface. The reflecting surface may be a reflecting plane with the point $P_4$ thereon and representing a specular reflection point along the multipath from the wireless source to the receiver. The reflecting plane may be defined by a unit normal vector $u_1$ and a scalar value $c_1$. A vector $r_1$ identifies the reflecting point location $P_4$ with respect to the reference location $P_1$. A value $\tau_0$ represents the direct-path length, or equivalently the direct-path propagation delay, measured along the straight line from the wireless source location $P_3$ to the receiver location $P_2$. A value $d_0$ represents the length (or delay) measured along the straight line from the wireless source location $P_3$ to the reflecting point location $P_4$, with a corresponding unit vector $w_0$ directed along the same line from the wireless source towards the reflecting point. A value $d_1$ represents the length (or delay) measured along the straight line from the reflecting point location $P_4$ to the receiver location $P_2$, with a corresponding unit vector $w_1$ directed along the same line toward the receiver.

In general, a basic solution for the multipath parameters associated with the above-described geometry may be determined knowing the receiver location $P_2$, the wireless source location $s$, and the reflecting plane location and its orientation (specified by $u_1$ and $c_1$). The multipath solution vector is represented by $$\tau w_1 = r + E_1 s - 2u_1 c_1 \tag{5}$$

where $$E_1 = 2 u_1 u_1^T - I \tag{6}$$

where the value of $\tau = d_0 + d_1$ represents the length (or delay) of the entire multipath from the wireless source location $P_3$ to the receiver $P_2$, through the reflection off of the reflecting plane at the point $P_4$. The matrix value $E_1$ represents an orthogonal transformation matrix (e.g., a reflection matrix) associated with the reflecting plane, and the matrix value $I$ represents an identity matrix. In general, the quantities on the right-hand side of equations (5) and (6) are known and the quantities on the left-hand side are unknown, yet determinable from the known quantities. Also, an angle of reflection $\theta_1$ associated with the multipath reflection at the reflecting plane is determined by $$\theta_1 = \arccos(u_1^T w_1) = \arccos(-u_1^T w_0). \tag{7}$$

A time delay $\tau$ associated with the exemplary generalized multipath is determined as the magnitude of the multipath solution vector $\tau w_i$.

$$\tau = \|r + E_1 s - 2 c_1 u_1\| \tag{8}$$

The unit vector $w_1$ may be determined by dividing the multipath solution vector by its magnitude $\tau$.

$$w_1 = \mathrm{unit}(r + E_1 s - 2 c_1 u_1) \tag{9}$$

The remaining values of $d_1$, $d_0$, and $w_0$ may also be calculated directly, as follows, from the already-determined values.

$$d_1 = \frac{u_1^T r - c_1}{u_1^T w_1}, \quad d_0 = \tau - d_1, \quad w_0 = -E_1 w_1 \tag{10}$$

The vector $r_1$, identifying the location of the reflecting point $P_4$ as previously described, is determined as $$r_1 = r - w_1 d_1. \tag{11}$$

In addition to determining the relationship, measurements of the multipath range may be used to develop an approximation of the surrounding physical environment or terrain. For example, referring to FIG. 4A, where the receiver is located at point Q and receives a signal propagating along the multipath 418 (and reflected by the reflector 410), and with the source located in the far field (a distance sufficiently far to allow a plane-wave approximation for received wireless signals 414), the receiver may infer that the point of reflection exists somewhere along a parabolic arc 422 defined by a focal point, being the location of the receiver, and equi-distant ranges to the source measured along each multipath 418. The multipath reflections occur somewhere along the parabolic arc 422. The actual point of reflection may be defined with greater specificity where multiple multipath signals originating from two or more distinct sources and formed by reflections from the same reflector 410 are received. The point of reflection may then be derived through standard mathematical manipulations (e.g., solution of simultaneous equations) of the geometries of each multipath 418.

Multipath Solution for Two Reflections

Figure 4C:
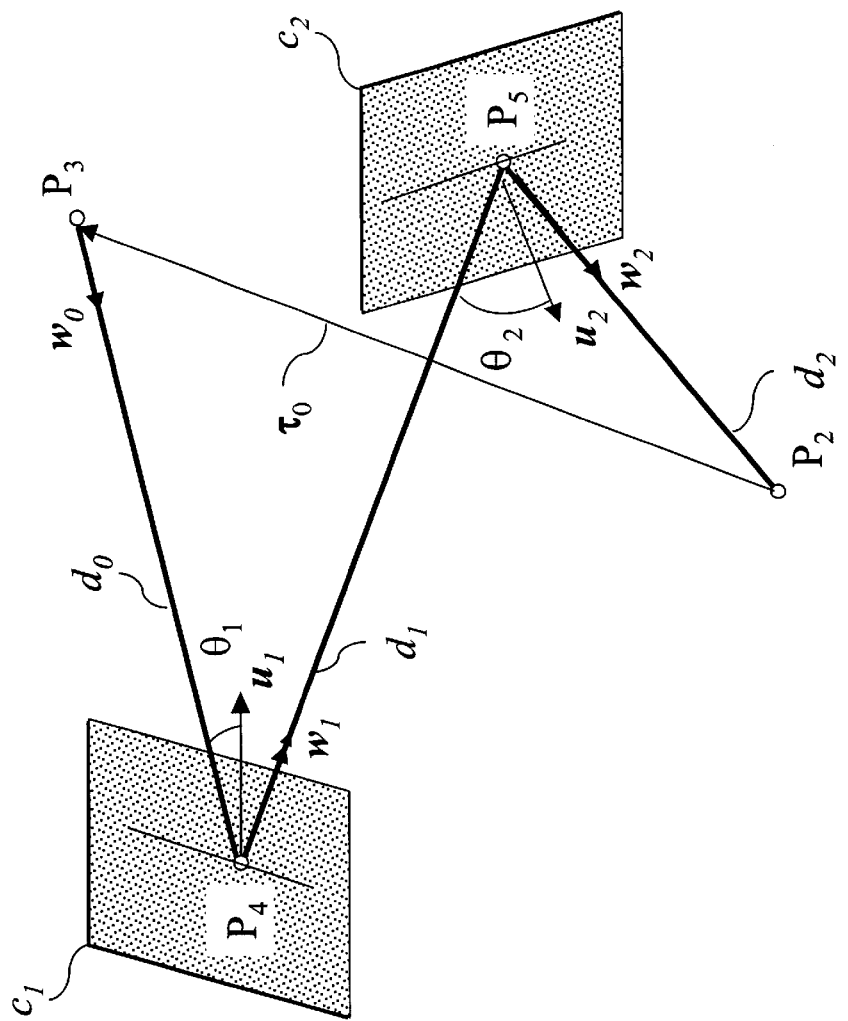
FIG. 4C is a schematic representation of a generalized three-dimensional geometry having multiple reflections.

FIG. 4C illustrates the generalized three-dimensional multipath geometry for two reflections. The geometry is similar to that illustrated in FIG. 4B with the inclusion of a second reflecting surface. Point $P_5$ represents the location of the point of reflection on the second reflecting surface. Like the first reflecting surface, the second reflecting surface may be a reflecting plane with point $P_5$ located thereon and representing a specular reflection point along the multipath from the first reflection location $P_4$ to the receiver location $P_2$. The second reflecting plane may be also defined by a unit normal vector $u_2$ and a scalar value $c_2$. A vector $r_2$ identifies the reflecting surface location $P_5$ with respect to the reference location $P_1$. In general, a multipath solution vector for the above-described geometry having two reflections is represented by $$\tau w_2 = r - E_2 E_1 s + 2 E_2 c_1 u_1 - 2 c_2 u_2 \tag{12}$$

where $$E_2 = 2 u_2 u_2^T - I. \tag{13}$$

where $E_2$ represents a transformation (or reflection) matrix associated with the second reflection plane. Generally, quantities on the right-hand side of equations (12) and (13) are known, whereas quantities on the left-hand side are unknown, yet determinable from the known quantities. The reflection angle $\theta_2$ of the multipath at the second plane is determined as:

$$\theta_2 = arccos(u_2^T w_2) = arccos(-u_2^T w_1). \tag{14}$$

The basic solution of the multipath vector for two reflections is represented by the multipath delay $\tau$ determined as $$\tau = \|r - E_2 E_1 s + 2 E_2 c_1 u_1 - 2 c_2 u_2\| \tag{15}$$

where the corresponding multipath unit vector is determined as $$w_2 = unit(r - E_2 E_1 s + 2 E_2 c_1 u_1 - 2 c_2 u_2). \tag{16}$$

As previously discussed in relation to equation (8), the time delay $\tau$ associated with the exemplary generalized multipath for two reflections is determined as the magnitude of the dual-reflection, multipath solution vector $\tau w_2$. Also, as was done for the single-reflection geometry in equation (8), the vector $w_2$ may be determined by calculating the unit vector of the multipath solution vector.

The remaining parameters of interest may be calculated directly from the basic solution as follows.

$$d_2 = \frac{u_2^T r - c_2}{u_2^T w_2}, \quad r_2 = r - w_2 d_2, \quad w_1 = -E_2 w_2 \tag{17}$$

$$d_1 = \frac{u_1^T r_2 - c_1}{u_1^T w_1}, \quad r_1 = r_2 - w_1 d_1, \quad w_0 = -E_1 w_1 \tag{18}$$

$$d_0 = \tau - d_2 - d_1 \tag{19}$$

The value $r_2$ in the above equations represents a vector from the reference coordinate $P_1$ (not shown), to the specular reflection point $P_5$ located on the second reflecting plane.

In general, multipath solutions for geometries having more than two reflections may be derived in a similar manner. In general, multipath solutions for geometries having more than two reflections may be derived in a similar manner.

Figure 4D:
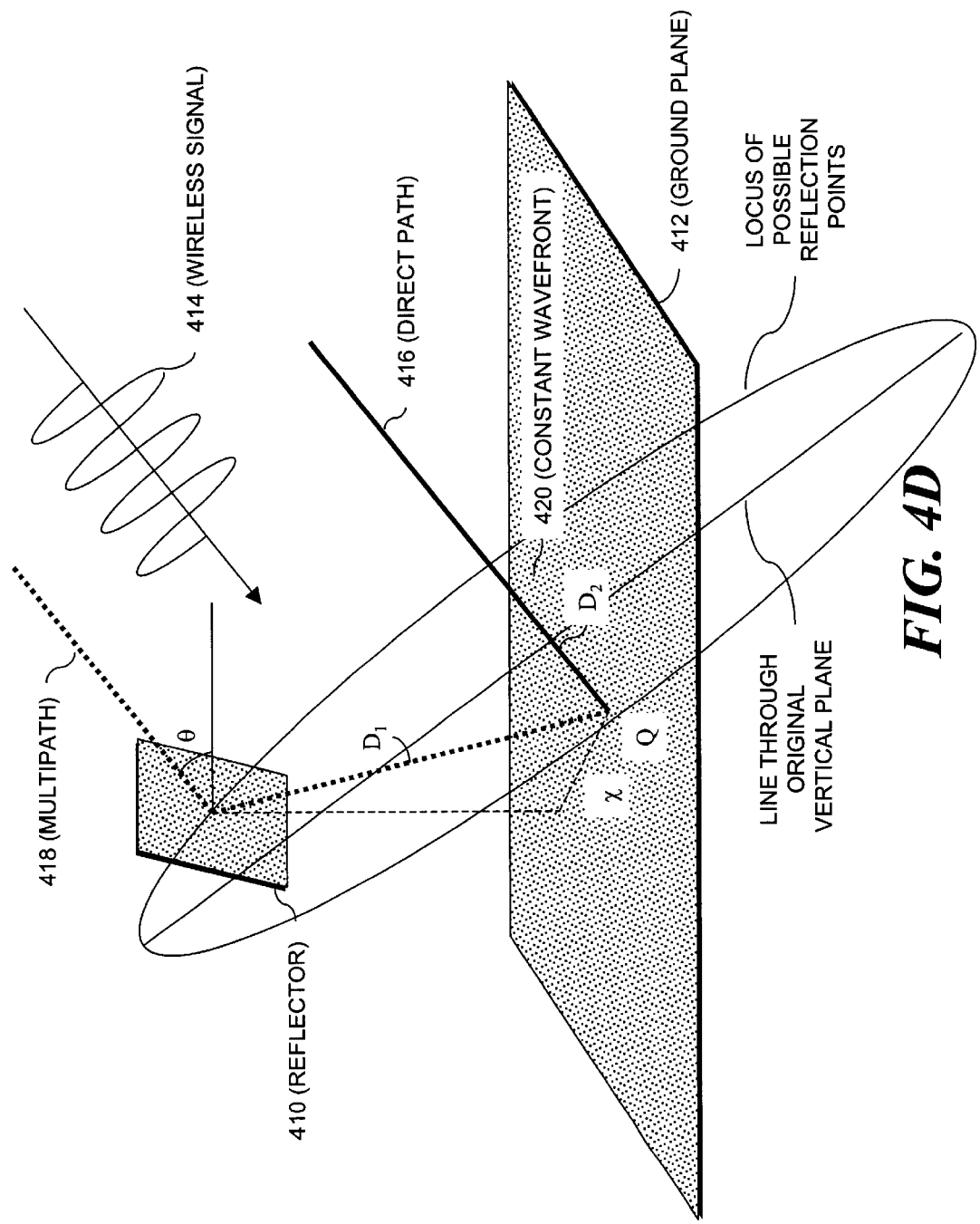
FIG. 4D is a schematic representation of a three-dimensional geometry relating to the invention shown in FIG. 1.

More generally, referring now to FIG. 4D, a three-dimensional geometry for a receiver receiving a direct signal and a single multipath is shown. Generally, the three-dimensional geometry may be formed by rotating the geometry illustrated in FIG. 4A around an axis defined by the direct path to point Q. Thus, FIG. 4A is merely a two-dimensional "slice" or plane through FIG. 4D, the resulting plane containing both point Q and the point of reflection.

As discussed in reference to FIG. 4A, some approximation of the surrounding terrain may also be determined in three-dimensions. Generally, in three-dimensional space, multipaths from three or more distinct sources would be necessary to determine the point of reflection. Thus, the receiver receiving multipaths signals from three or more sources and reflected from different points can provide an approximate three-dimensional image of the surrounding area. As the number of sources and/or the integration time increases, so will the detail of the three-dimensional image.

In some embodiments, the relationship between the receiver's location and the multipath includes information indicative of the relative velocity between the receiver, the source, and the reflector 410. For example, the relationship may be determined including Doppler coefficients for the multipath signal, the Doppler coefficients providing information indicative of the relative velocity between the receiver, the source, and the reflector 410. The Doppler coefficients may be determined from the carrier signal of a modulated navigation signal. The direction of motion may determined from the sign (+/−) of the Doppler coefficients (e.g., a positively signed coefficient indicative of motion towards the receiver, negatively signed coefficient indicative of motion away from the receiver). The velocity may be determined from the magnitude of the Doppler coefficients, larger Doppler coefficients indicating a greater velocity and a zero-valued coefficient indicating no movement.

The Doppler coefficients may be used to estimate the velocity of any one of the receiver, the source, or the reflector 410 where the velocities of the other two are known. For example, since the velocity of the receiver is generally determinable (e.g., through a speedometer that may be collocated with the receiver) and the velocity of the source may be estimated (e.g., it is known accurately for a GPS satellite), the Doppler coefficients, once determined, may be used to estimate the motion of the reflector 410. In some embodiments, the receiver provides a warning when the Doppler coefficients are beyond a predetermined threshold.

In other embodiments, the received signal may be temporarily stored locally within the receiver. The receiver then delays the locally stored received signal and correlates it with a locally stored representation of the same signal. In this embodiment, the stored received signal is delayed and correlated with the locally-stored representation, with the delay being representative of an earlier time (a negative delay) (step 310, shown in FIG. 3).

Navigation Solutions

The primary objective of the multipath navigation algorithms is to produce estimates of the receiver position r (and optionally the receiver velocity v) based on a sequence of both indirect and direct measurements. As used herein, an indirect measurement refers to the reception of a wireless navigation signal that propagated by a path other than the direct, line-of-sight path. The indirect path may include specular reflections and non-specular reflections. In general, there is a temporal aspect to a multipath solution as any of the wireless sources, the reflecting surfaces, or the receiver may be moving. The delay along the direct path (e.g., the line from point $P_2$ to $P_3$ in FIG. 4B) from the receiver to the wireless source at an instant of time denoted by "$t_j$" (or simply "j" for notational convenience) is provided in equation (20). Also, in general, the receiver may receive wireless signals from multiple wireless sources, such as multiple navigation satellites (e.g., multiple, in-view elements of a constellation of GPS satellites). The subscript "i" denotes the $i^{th}$ satellite, being any one of the constellation of satellites. The direct-path delay to the $i^{th}$ satellite at time j is $$\tau_{i0}(j) = \|s_i(j) - r(j)\|. \tag{20}$$

As described in relation to FIG. 4B, the vector r(j) identifies the receiver position $P_2$ in relation to the reference location $P_1$ at time j. Similarly, the vector $s_i(j)$ identifies the position of the $i^{th}$ wireless source, or satellite, in relation to the reference location $P_1$ at the same time j.

Derivation of a navigation solution for a single multipath from any satellite is described below. The calculations are substantially identical for any additional multipaths.

The feasibility of using multipath measurements for navigation arises from the determination of a differential delay $\delta\tau_i$, defined as the delay difference between the multipath delay $\tau_i$ and the direct-path delay $\tau_{i0}$.

$$\delta\tau_i(j) = \tau_i(j) - \tau_{i0}(j) \tag{21}$$

A re-characterization of the differential delay $\delta\tau_i$ in terms of multipath parameters $\{g_{\tau i}(j), c_{\tau i}(j)\}$ is provided as follows.

$$\delta\tau_i(j) = g_{\tau i}^T(j) r(j) + c_{\tau i}(j) \tag{22}$$

The multipath parameters are themselves functions of the direction to the satellite and the directions and locations of the one or more reflecting planes, but are independent of the receiver position r(j). In equation (22), it is understood that the receiver position r(j) and position of the $i^{th}$ satellite $s_i(j)$ are referred to a common local Earth-fixed coordinate frame having an origin located within the general vicinity of the receiver (e.g., the point $P_1$ of FIGS. 4B and 4C). The location of the origin $P_1$ is arbitrary but known to the multipath navigator to a suitable degree of precision. For GPS navigation solutions having geometries in which the reflecting planes are fixed, the multipath parameters vary slowly over time due to the slow variation of the unit vector, unit($s_i$), to each of the satellites. In some embodiments including reflections at stationary surfaces in which the navigation interval is limited to several minutes, the multipath parameters may be estimated as constant with respect to time j. For navigation intervals exceeding a threshold (e.g., several minutes), however, it may be necessary to track any slow changes in the multipath parameters. Tracking the multipath parameters in such a slowly changing environment may be implemented by means of any suitable method of tracking such values, as are generally known to one of ordinary skill in the art in the area of navigation, such as a delay-locked loop.

In general, physical realizations of the geometries shown in FIGS. 4B and 4C, result in an approximation error in equation (22). This error results from the satellites not being located at an infinite distance from the receiver. An approximation error is also introduced for reflection angles $\theta_i$ near 90 degrees, because of an associated singularity (division by zero). This singularity does not cause problems in practice, however, since indirect paths with reflection angles near 90 degrees lead to very small values of the multipath parameters and thus are not useful for navigation. In physically realizable embodiments the multipaths having reflection angles near 90 degrees would be indistinguishable from the direct path signal. For example, in embodiments using filtering techniques to separate direct and reflected received signals, the finite width of a realizable filter (e.g., the "finger" of a rake filter, or the chip length of a CDMA signal) will result in a multipath signal having an angle of reflection near 90 degrees being interpreted as a direct signal. For the GPS embodiment described herein, the approximation error in equation (22) is less than 300 parts per million as long as the reflection angles $\theta_i$ are less than 85 degrees.

Equation (22) is of bilinear form, since both the receiver position and the multipath parameters are uncertain. This specific form allows certain simplifications to be made in the multipath navigator algorithms.

Multipath Parameters: Analytical Form

For a multipath solution, the multipath parameters may be calculated analytically from the geometries illustrated in FIGS. 4B and 4C. In general, the multipath solution is independent of the particular propagation path. the indirect propagation path may include one or more reflections and the reflections may be substantially specular or non-specular. As one illustrative example, the multipath parameters for a geometry having one reflection are represented as follows:

$$g_{\tau i} = a_{1i} u_1, \quad c_{\tau i} = -a_{1i} c_1 \tag{23}$$

where $$a_{1i} = \frac{u_{si}^T w_{1i} + 1}{u_1^T w_{1i}} = 2 u_1^T w_{1i}. \tag{24}$$

In general, $u_{si}$=unit($s_i$) is a unit vector from the receiver location $P_2$ to the $i^{th}$ satellite location $P_3$. In general, for geometries having one reflection, the magnitude of the multipath parameter is no greater than two (i.e., $\|g_{\tau i}\| \leq 2$). For geometries having two reflections, the values of the multipath parameters are represented as follows:

$$g_{\tau i} = a_{1i} u_1 + b_{1i} u_2, \quad c_{\tau i} = -a_{1i} c_1 - b_{1i} c_2 \tag{25}$$

where $$b_{1i} = a_{2i} - a_{1i} \frac{u_1^T w_{2i}}{u_2^T w_{2i}}, \quad a_{2i} = \frac{u_{si}^T w_{2i} + 1}{u_2^T w_{2i}}. \tag{26}$$

Expressions similar to equations (23) through (26) may be derived in a similar manner for multipath geometries having more than two reflections.

Knowledge of the multipath parameters alone may not be sufficient to determine a full multipath solution (i.e., the location of the specular reflection points). Fortunately, however, a navigation solution does not require the full multipath solution. Navigation using multipath may be performed for situations in which the multipath parameters are determinable from the combined observation of the direct and indirect path (multipath) measurements so that changes in receiver location $P_2$ produce changes in the measured differential delays $\delta\tau_i(j)$.

Accurate multipath navigation for any number of reflections depends only on knowledge of four multipath parameters for each multipath $\{g_{\tau i}, c_{\tau i}\}$. These parameters may be estimated for any multipath from a particular satellite through a sequence of measurements of the differential delays $\delta\tau_i(j)$ for a particular satellite. The accuracy of multipath navigation depends fundamentally on the accuracy of the multipath parameter estimates.

Multipath Wireless Navigation System

Figure 5:
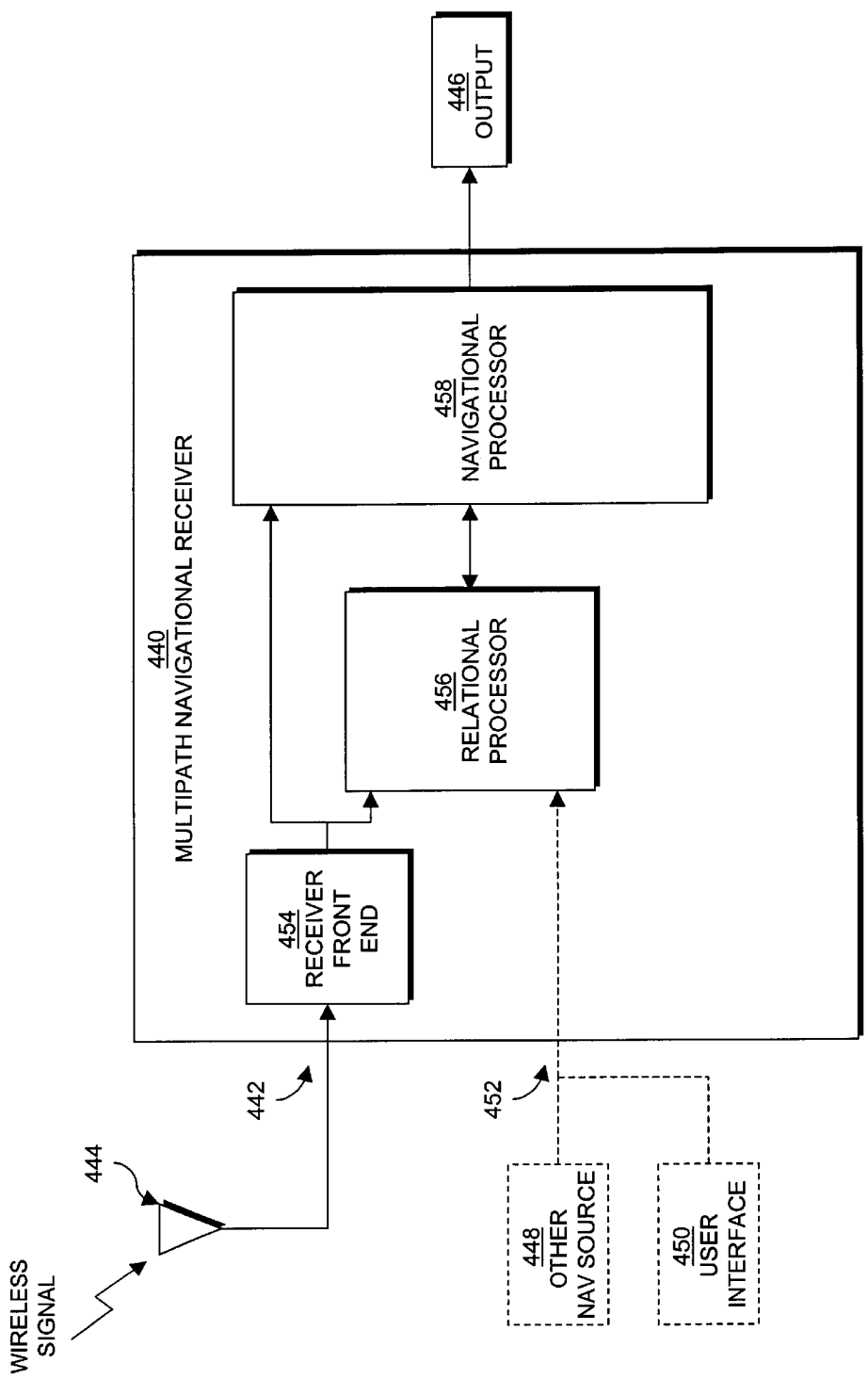
FIG. 5 is a block diagram depicting one embodiment relating to the invention shown in FIG. 1.

Referring to FIG. 5, in one embodiment, a multipath navigational receiver 440 includes a sensor input 442 in communication with a wireless sensor 444. The multipath receiver 440 optionally includes a second input 452 in electrical communication with other navigational sources 448 (shown in phantom) and/or a user interface 450 (also shown in phantom). The multipath receiver 440 also includes a navigational output 446 providing an indication of the determined navigation solution, such as the geographical position of the receiver.

The multipath navigational receiver includes circuitry implementing a wireless receiver front end 454, a relational processor 456, and a navigational processor 458. The wireless receiver front end 454 is in electrical communication with the sensor input 442, receiving the sensed wireless signal. The receiver front end 454 is in further electrical communication with each of the relational processor 456 and the navigational processor 458. The receiver front end 454 transmits a representation of the received signal to the relational processor 456 and the navigational processor 458. The relational processor 456 is in electrical communication with the second input 452 (if present), receiving navigational information from other navigational sources 448 capable of determining the receiver's location and/or from operator input via the user interface 450. The relational processor 456 determines the relationship between the current location and the multipath delay (e.g., by relating direct-path and multipath signals and/or by relating the multipath signal to a location determined using another navigational source 448). The navigational processor 458 processes the representation of the signal received from the receiver front end 454 with the relationship information received from the relational processor 456 to determine the navigation solution. The navigational processor transmits the determined navigation solution to the output 446.

Generally, the sensor 444 receives the wireless signal and channels it into the multipath receiver 440 through the receiver's sensor input 442. In some embodiments, the sensor 444 is an antenna, such as an electrically conducting antenna. The antenna 444 may be a substantially linear-polarized antenna, such as a monopole, a dipole, a loop, a slot, or a patch antenna. Where greater antenna directivity is required, the antenna may be a directional antenna, such as a log-periodic, a Yagi-Uda, or, in general, any antenna array. In other embodiments, the antenna may be a circularly-polarized antenna, or more generally, an elliptically-polarized antenna, such as a cross-dipole, a spiral, or a logarithmic-spiral. The antenna 444 may also be an aperture antenna, such as a slot, a horn, or a reflector antenna, such as a parabolic dish antenna. In other embodiments, the sensor 444 is a dielectric antenna. In still another embodiment, the sensor 444 is an optical detector, such as a photodiode or an avalanche photodiode. In yet another embodiment, the sensor 444 is an acoustic transducer translating pressure variations (e.g., sonic waves, ultrasonic waves) into electrical signals.

In some embodiments, the multipath receiver 440 determines its current location estimate from information received from other navigational sources 448. These other navigational sources 448 may include sources used in relation to navigational techniques commonly referred to as "dead-reckoning." Such sources include distance and direction sensors (e.g., odometers, speedometers, magnetic compasses, gyroscopes, pressure sensors, and tilt-detectors to name a few) and determine the receiver's location based on an initial location combined with information relating to distance traveled, speed, and direction. A receiver provided with an initial location and equipped with one or more of the other navigational sources 418 may determine its location after it is moved from the initial location to a subsequent location. Generally, the receiver's initial location can be approximated by a point (e.g., the center of a vehicle or a ship) that can be defined by coordinates, such as latitude, longitude, and optionally, altitude. Determination of the receiver's current location may be approximated using the same coordinates offset by the displacement information provided by a navigational aid 418. For example, where the receiver is initially located at coordinates (0,0,0), and the navigational aids indicate that the receiver has moved in a known bearing, at a known rate, for a known time, then offset coordinates may be determined and used to compute the current location.

In some embodiments, the multipath receiver 440 determines its current location estimate from information received via the user interface 450. For example, a user may determine the location of receiver 440 using a map. In an urban environment, the user's location in relation to a street grid may specify the receiver's 440 initial location with sufficient precision.

In more detail, for RF embodiments, the receiver front end 454 includes a filter (not shown), such as a low-pass or bandpass filter removing unwanted signals. The receiver front end 454 may also include a low-noise amplifier (LNA) (not shown) for amplifying the received signal and improving the overall sensitivity of receiver 440 to low-level signals. The receiver front end 454 may also include one or more mixing stages (not shown) where the received RF signal is mixed with the output of a local (e.g., sinusoidal) oscillator(s) (not shown) yielding sum and difference signals. Depending on any requirement for spectrum inversion, either the sum or the difference signals are selectively filtered, representing an intermediate frequency signal for further processing by the receiver 440. Additional gain and/or attenuation stages (not shown) may also be provided within the receiver front end 454 to control the multipath receiver's 440 sensitivity (noise figure).

GPS Embodiment

Figure 6:
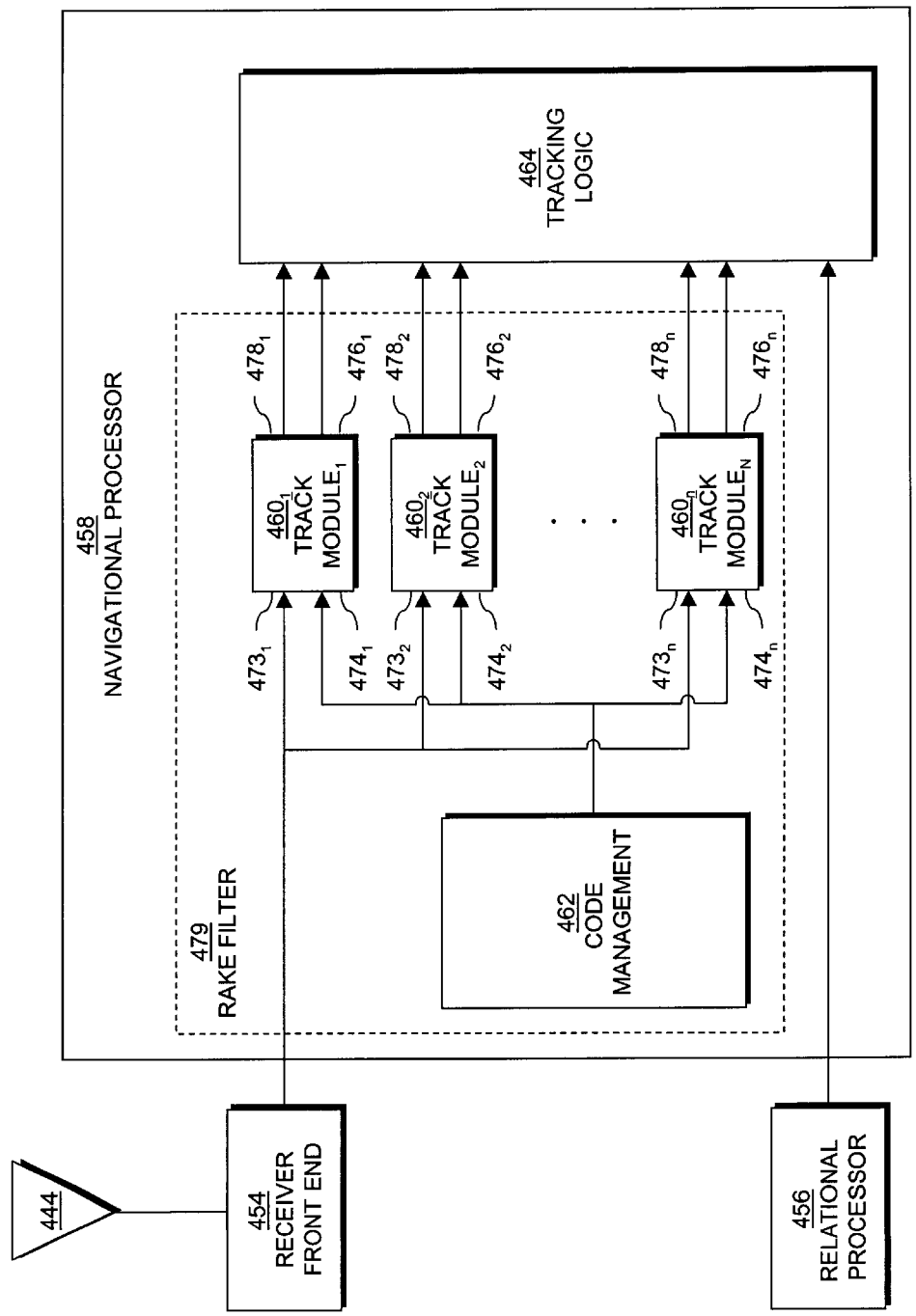
FIG. 6 is a block diagram of an alternative embodiment relating to the invention shown in FIG. 1.

Referring now to FIG. 6, in one embodiment of a GPS receiver, the navigational processor 458 includes a series of n track modules $460_1, 460_2 \ldots 460_n$ (generally 460), a code management element 462, and tracking logic 464. Each of the track modules 460 has a first input 473 in electrical communication with the receiver front end 454 and a second input 474 in electrical communication with the code management element 462. Each of the track modules 460 also has a first and second outputs 476, 478 in electrical communication with the tracking logic 464. Each track module 460 transmits a signal at its first output 476 indicative of the delay, corresponding to the range (the "pseudo range"), to the navigational source being tracked. Each track module 460 transmits a signal at its second output 478 indicative of the "pseudo delta range," which represents a smaller adjustment to the pseudo range, typically tending to increase the precision of the pseudo range. For example, in some GPS receivers, the RF carrier signal may be used to increase the precision of the range measurement by allowing the receiver to determine a pseudo delta range from the carrier to be used in conjunction with the pseudo range determined using the CDMA code.

In one embodiment, the multipath navigational receiver 440 is obtained through the modification of an existing GPS receiver. GPS receivers generally include multiple track modules 460 used to identify direct-path signals for each of several (e.g., up to 12) GPS satellites. Generally, for unmodified GPS receivers, one track module 460 is allocated for each satellite. In accordance herewith, additional track modules 460 are added to a GPS receiver. In another embodiment, existing track modules, such as those used during acquisition, or track modules intended for the encrypted, military, code, are reallocated to support navigation using multipath signals.

In some embodiments, each of the track modules 460 receives substantially equivalent signals from the receiver front end 454, which are split substantially equally among the track modules 460. Each of the track modules 460 also receives, from the code management element 462, a code associated with the received signal. For embodiments where the multipath receiver 440 tracks to more than one navigational source, each navigational source being associated with a unique code sequence of bits the code management element 462 stores at least one code for each navigational source. In some embodiments, four or more track loops are associated with each navigational source.

In a GPS-configured embodiment, the received GPS signal generally includes one or more RF signals (e.g., a first signal at frequency $L_1$=1575.42 MHz, and a second signal at frequency $L_2$=1227.6 MHz) each of the RF signals being modulated with a navigational signal. The navigational signal may contain data such as the ephemeris information specifying the satellite's location, or update information to be used by the multipath receiver 440 to correct ephemeris information that may be stored within the receiver 440. The GPS signal is also modulated with a spread-spectrum signal. In particular, the GPS signal is modulated with a PRN code according to a CDMA protocol. The code rate (e.g., 1.023 MHz for C/A code, and 10.23 MHz for P code) is typically much greater than the data rate of the navigational signal. The PRN codes are selected to be uniquely identifiable with particular satellites and allow multiple satellites to share the same operating frequency or frequencies. In some embodiments, each of the track modules 460 tracks a different PRN code representative of a different satellite. In other embodiments, multiple track modules 460 track the same PRN code. In some embodiments, other spread spectrum techniques may be used, such as frequency hopping. In a frequency hopping scenario, the navigational signal from the wireless navigational source is transmitted over a group of frequencies, the signal being transmitted on one frequency at a time.

A receiver adapted to receive multipath signals may be used in determining the relationship between the receiver location and the multipath by separately identifying related multipath signals including the direct path signal (each signal having originated from the same source). In one embodiment, a multipath receiver includes a rake filter to separate the differently-delayed, related signals. Techniques employed by the rake filter naturally allow for determining an approximation of the relative delay between each of the multipaths and the direct path signals. For example, the rake filter includes separate correlators, or "fingers," used in separating the related multipath and direct-path signals. In general, a signal is transmitted from a source at a first time $t_0$, and arrives at a remotely-located receiver at a second time $t_1$ (some time later than $t_0$). Without reflections, the received signal at time $t_1$ is representative of the direct-path signal. Where reflections occur, the reflected signals are received at other times $t_2$, $t_3$, etc., each later than $t_1$ and representing a different delayed version of the direct path signal.

In rake-configured communication systems, each of the signal components (e.g., direct path and one or more multipaths) is obtainable at the appropriate "finger" of the rake filter, each finger isolating signals at a different delay value. Since small delays are generally tolerable in communications systems, the rake receiver is used to gather received signal energy from the direct path and any multipath components of the same originating signal, enabling the communications receiver to combine the energy received at each finger into a single received signal having an amplitude greater than the amplitudes of the individual signal components. In one embodiment the track modules 460 and the code management element 462 are provided by at least one rake filter 479, the track modules 460 representing the fingers of the rake. Additional rake filters 479 are included for processing data from different navigation sources.

In a range-based navigational application, such as GPS, the delays are critical to the accuracy of the solution. The rake receiver allows related multipath signals to be identified separately from the direct-path signal and from each other, the different multipath signals being received at different fingers of the rake. Generally the delay value associated with each finger is known, or determinable, and may be used to identify the delay difference (and ultimately the range difference) of each multipath.

Tracking Loop

Figure 7:
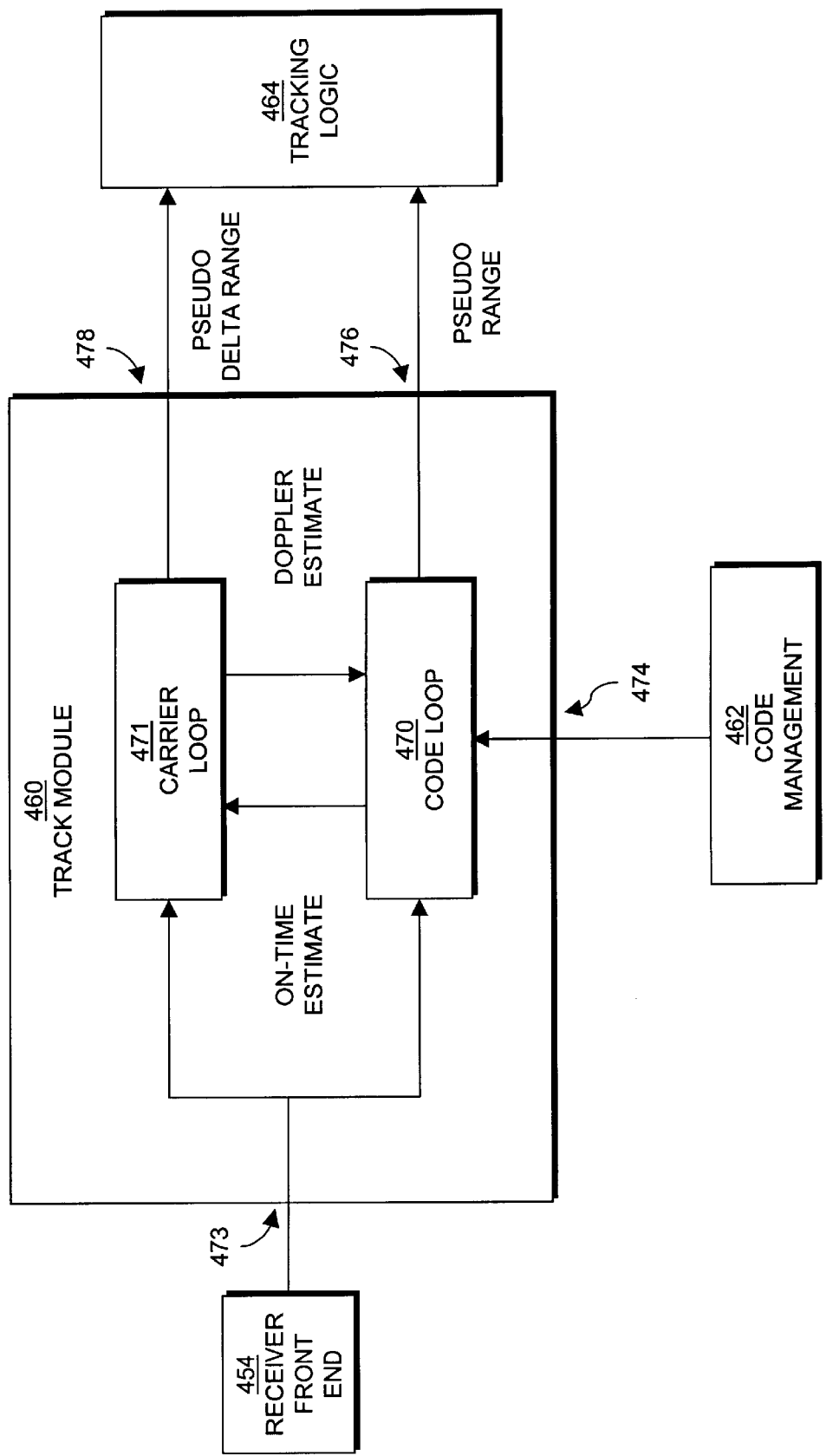
FIG. 7 is a block diagram of a track module relating to the embodiment of the invention shown in FIG. 6.

Referring to FIG. 7, each of the track modules 460 includes a code loop 470 and a carrier loop 471. The code loop 470 is in electrical communication with the receiver front end 454, the code management element 462, and the carrier loop 471. The code loop 470 receives a representation of the received signal from the receiver front end 454 and also receives a stored representation of the PRN code from the code management element 462. The code loop 470 determines a pseudo range based on the received signal and stored code and transmits the pseudo range to the tracking logic 464. The carrier loop 471 is also in electrical communication with the receiver front end 454 and the code loop 470. The carrier loop 471 receives the same representation of the received signal from the receiver front end 454 and a de-spread representation of the received signal from the code loop 470. The carrier loop 471 determines any phase offset of the received signal. Phase offset is generally indicative of a Doppler shift that may be caused by relative motion between the receiver's antenna 444 and the transmitter. The carrier loop 471 may also be used to determine whether a multipath includes an even or odd number of reflections, an even number of reflections resulting in an in-phase signal, an odd number of reflections resulting in a signal with a phase shift of 180 degrees. The carrier loop 471 provides a pseudo-delta-range output signal to the tracking logic 464, the pseudo-delta range indicating an offset, or delta, value to be combined with the pseudo-range output signal from the code loop 470 for increased accuracy.

Figure 8A:
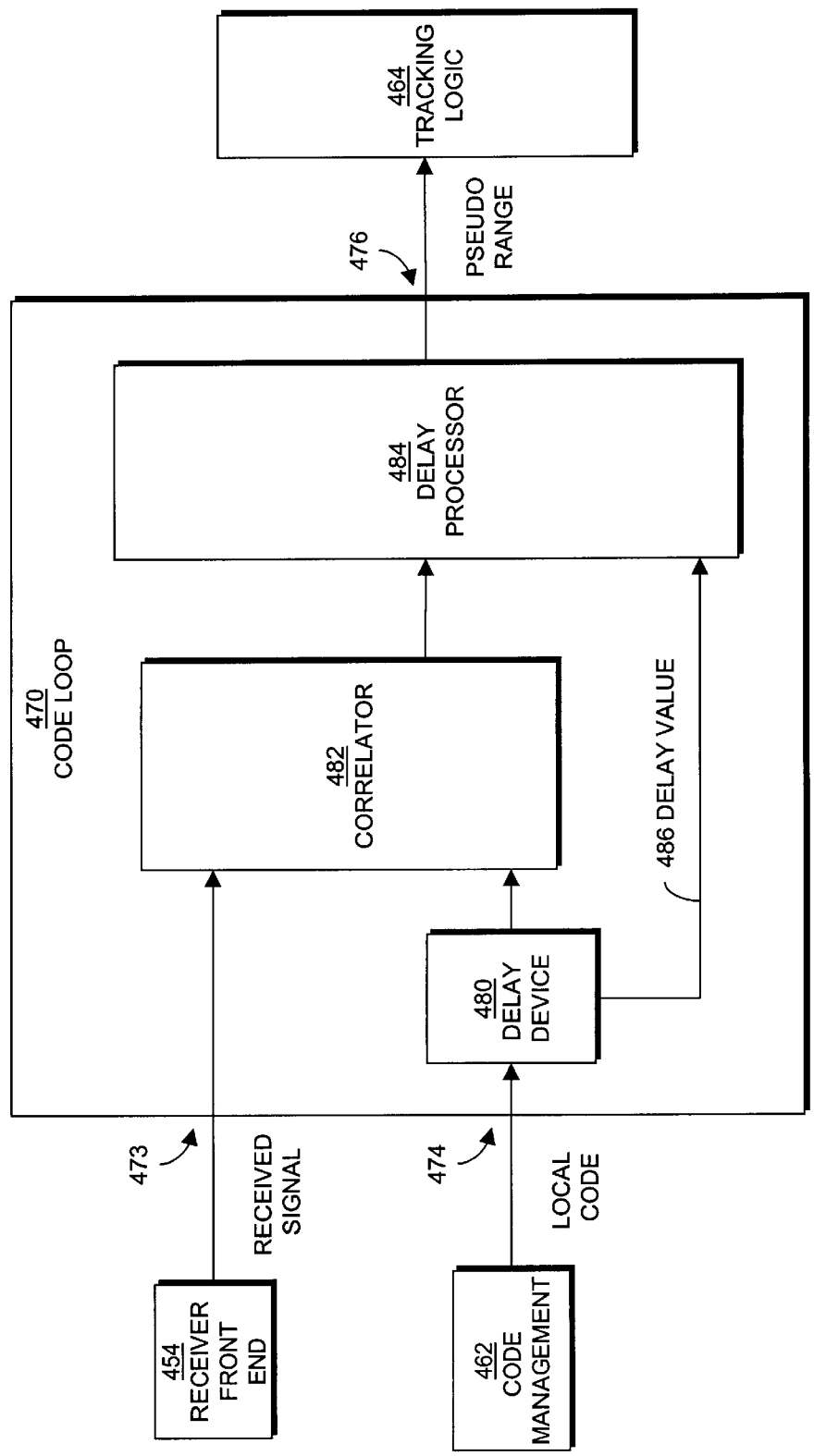
FIG. 8A is a block diagram of a code loop relating to the embodiment of the invention shown in FIG. 7.

Referring to FIG. 8A, in one embodiment, the code loop 470 includes a delay device 480, a correlator 482, and a delay processor 484. The delay device 480 is in electrical communication with the correlator 482 and the delay processor 484. The delay device 480 also receives the locally stored PRN code from the code management element 462 and transmits a delay value to the delay processor 484. The function of the delay device 480 is to delay the locally stored code sequence associated with the received signal in order to facilitate determination of the propagation delay of the signal.

In operation, the delay device 480 receives the locally stored PRN code and applies a series of delays to that code value. The delay device 480 provides the code sequence to the correlator 482 and the delay value 486 (i.e., the amount of a particular delay) to the delay processor 484. The correlator 482 receives a representation of the received signal from the receiver front end 454 and correlates the received signal with each delayed version of the stored PRN code. The correlator 482 provides the results of each correlation to the delay processor 484, which evaluates the correlation for each delay value 486.

In some embodiments, the correlator 482 includes an advanced correlator, a centered correlator, and a retarded correlator. That is, three correlations are performed for each delay, where one correlation is performed at the current delay value, a second correlation is performed at a slightly greater delay value, and a third correlation is performed at a slightly smaller delay value. This technique lends itself to the identification of a correlation peak where the correlation result from the centered correlator is greater than each of the associated advanced and retarded correlators.

In one embodiment, the delay device 480 is a shift register, the delay value 486 corresponding to the number of bits the locally-stored PRN code has been shifted within the shift register. In another embodiment, the delay processor 484 includes a comparator comparing the correlator output to one or more predetermined threshold values representative of a signal correlation.

Tapped Delay Line

Figure 8B:
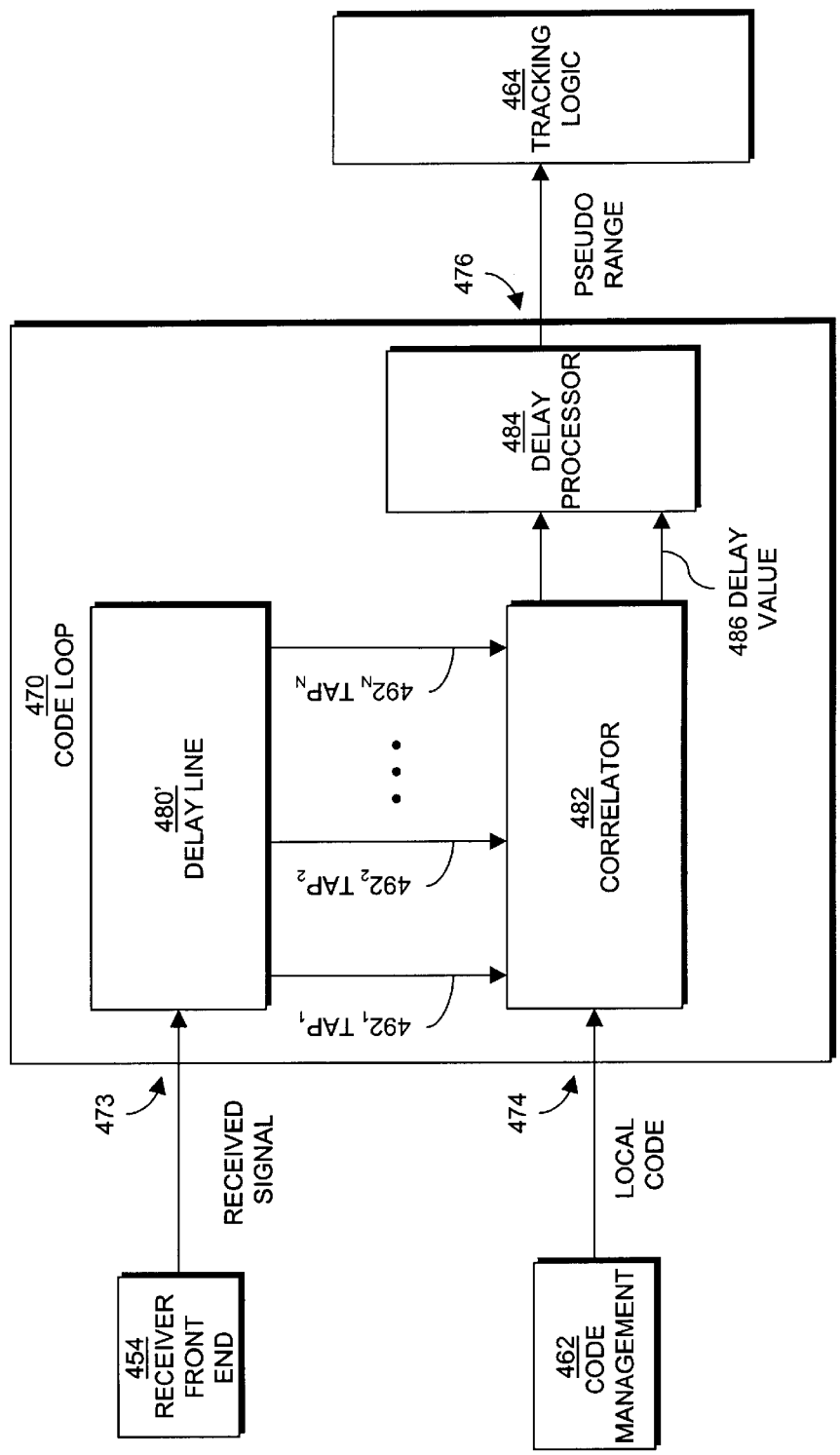
FIG. 8B is a block diagram of an alternative embodiment of the code loop processor relating to the embodiment shown in FIG. 5.

In an alternative embodiment, referring to FIG. 8B, the track modules 460 of FIG. 6 are replaced with a delay line 480'. The delay line receives the representation of the received signal from the receiver front end 454 and transmits a series of n outputs, at each of n taps $492_1$, $492_2$ ... $492_n$ (generally 492). Generally, the output at each of the taps 492 represents the received signal delayed by a different amount of time. The delay line 460 is also in electrical communication with the delay processor 484. The delay processor 484 receives the n outputs from the taps 492 and a locally stored representation of the code from the code management element 462. The delay processor 484 determines at which delay(s) correlations exist between the tap 492 output signal and the locally stored representation. The delay processor 484 determines a pseudorange associated with each correlation and provides the determined pseudorange(s) to the tracking logic 464.

In one embodiment, the delay line is an analog delay line, such as a length of waveguide or cable. In other embodiments, the delay line is a surface acoustic wave device.

Figure 9A:
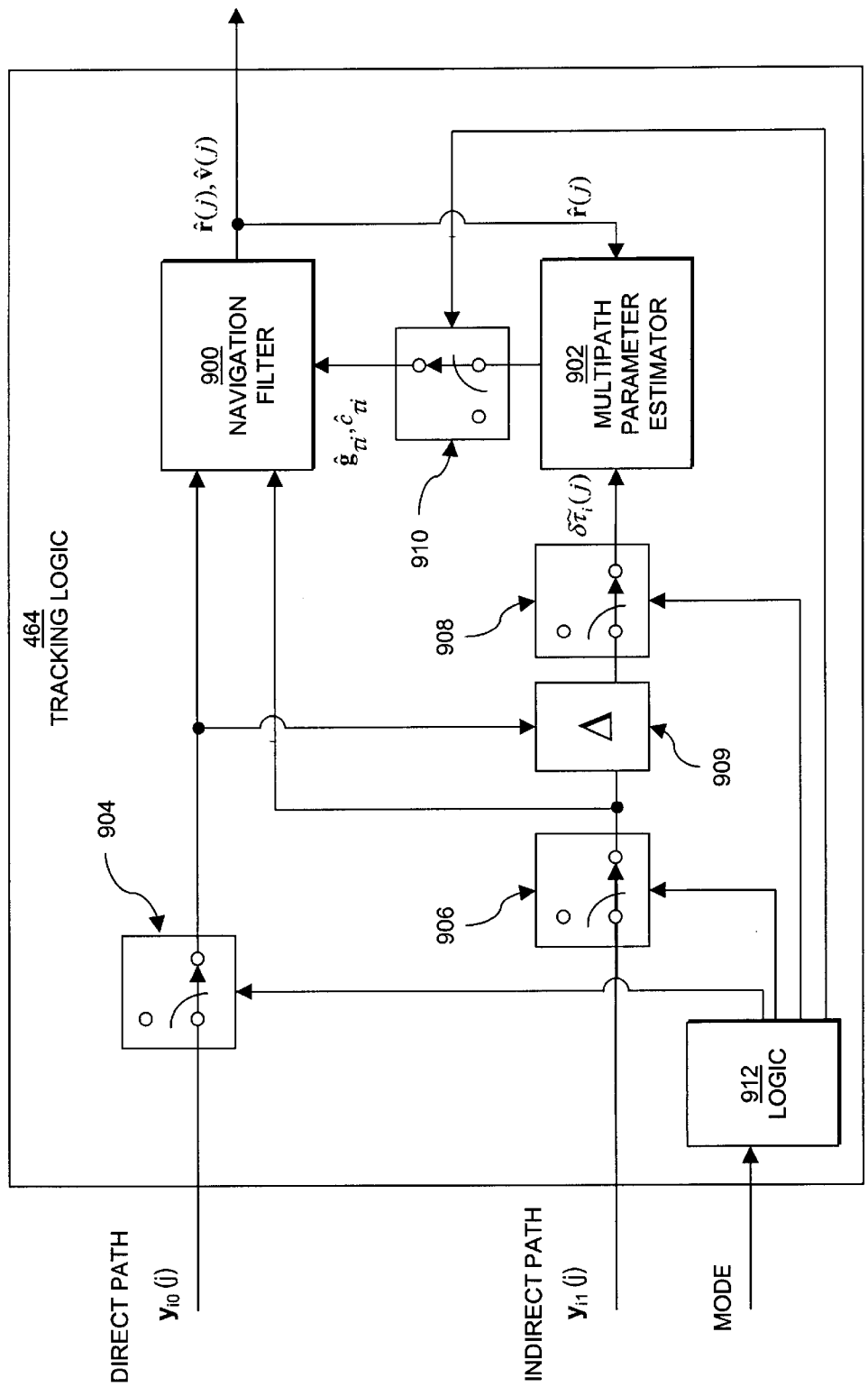
FIG. 9A is a block diagram of tracking logic configured in a first mode and relating to the embodiment of the invention shown in FIG. 7.

In one embodiment, referring now to FIG. 9A, the tracking logic 464 includes a navigation filter 900, a multipath parameter estimator 902, a first switch 904, a second switch 906, a third switch 908, a difference combiner 909, a fourth switch 910 and a logic element 912. The switches may be mechanical switches, electro-mechanical relays, electrical switches, such as transistors (e.g., FETS), or implemented in firmware, or software. The navigation filter 900 receives a direct path signal $y_{i0}(j)$ from the $i^{th}$ satellite. The direct path signal is connected to the navigation filter through the first switch 904 that operates to selectively apply or remove the direct path signal $y_{i0}(j)$. Similarly, the navigation filter 900 selectively receives a multipath signal $y_{i1}(j)$ from the $i^{th}$ satellite. The multipath signal $y_{i1}(j)$ is provided to the navigation filter 900 through the second switch 906 that operates to selectively apply or remove the multipath signal $y_{i1}(j)$. The difference combiner 909 determines, responsive to receiving the direct path $y_{i0}(j)$ and the indirect path $y_{i1}(j)$, the differential delays $\delta\tau_i(j)$ as the direct path delay subtracted from the multipath delay. The difference combiner 909 provides the differential delay $\delta\tau_i(j)$ to the multipath parameter estimator 902. The multipath parameter estimator 902 selectively receives the differential delay $\delta\tau_i(j)$ through the third switch 908 that operates to apply or remove the differential delay $\delta\tau_i(j)$, and also receives the position state vector estimate $\hat{r}(j)$ transmitted by the navigation filter 900. The multipath parameter estimator 902 determines estimates of the multipath parameters $g_{\tau i}$ and $c_{\tau i}$ responsive to receiving the differential delay $\delta\tau_i(j)$ and the position state vector estimate $\hat{r}(j)$, and provides the estimated multipath parameters $\hat{g}_{\tau i}$, $\hat{c}_{\tau i}$ to the navigation filter 900 through selection switch 910, controlled by the logic 912. The navigation filter 900, in turn, determines a revised state vector estimate, including the position state vector $\hat{r}(j)$, responsive to receiving the direct path signal $y_{i0}(j)$, the indirect path signal $y_{i1}(j)$, and the estimated multipath parameters $\hat{g}_{\tau i}$, $\hat{c}_{\tau i}$. The navigation filter 900 then provides the revised state vector estimate including the estimate of the receiver's position $\hat{r}(j)$ and, optionally, the receiver's velocity $\hat{v}(j)$.

In one embodiment, the navigation filter 900 includes a conventional Kalman filter, in which the model parameters are assumed known. Use of the Kalman filter within the navigation filter 900 presumes that the multipath parameters are reasonably well known.

The effects of multipath parameter estimation errors can be accounted for by using error statistics calculated in the multipath parameter estimator 902, which represents an auxiliary filter and provides estimates of the multipath parameters as well as the associated error statistics.

Figure 9B:
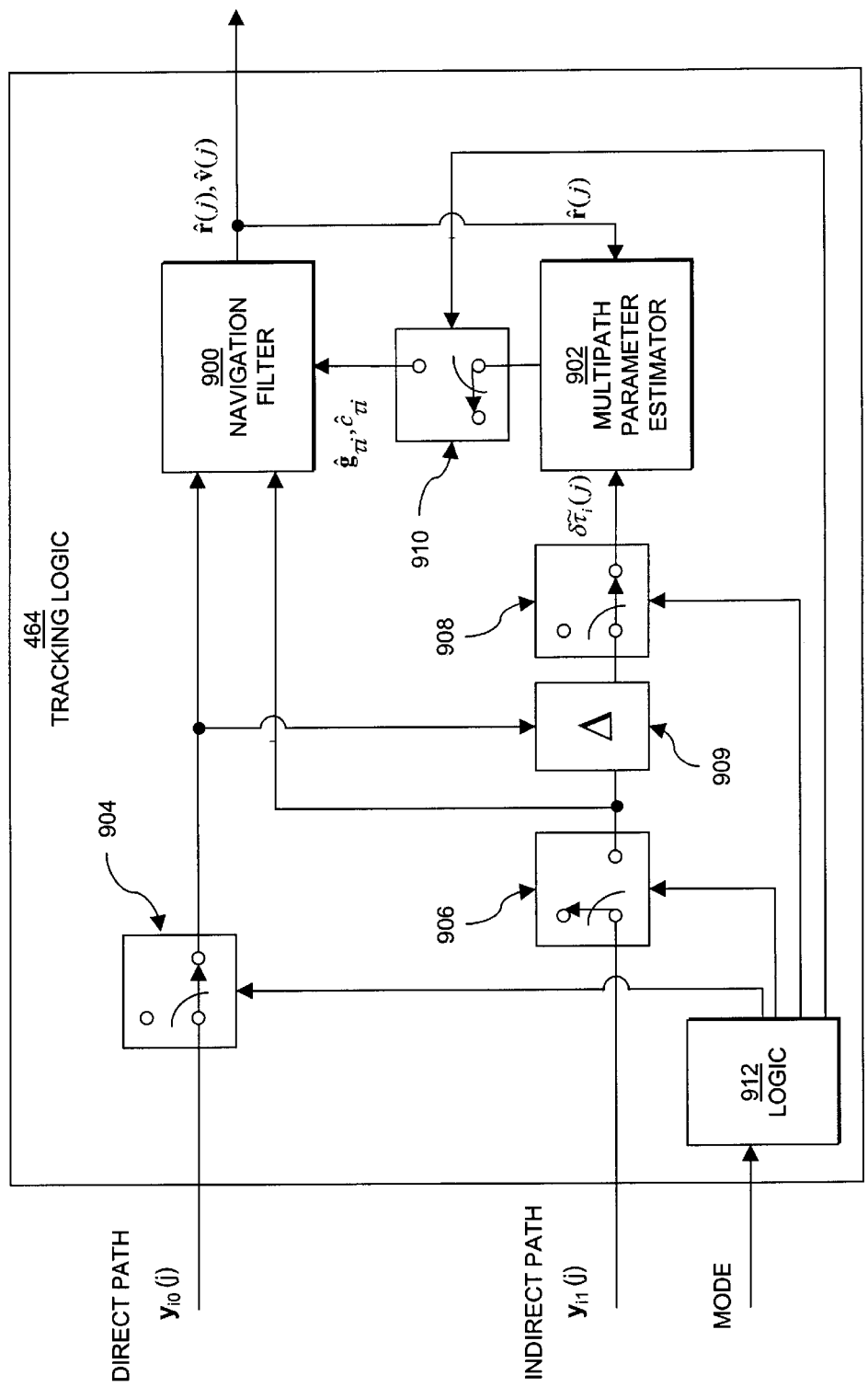
FIG. 9B is a block diagram of tracking logic configured in a second mode and relating to the embodiment of the invention shown in FIG. 7.
Figure 9C:
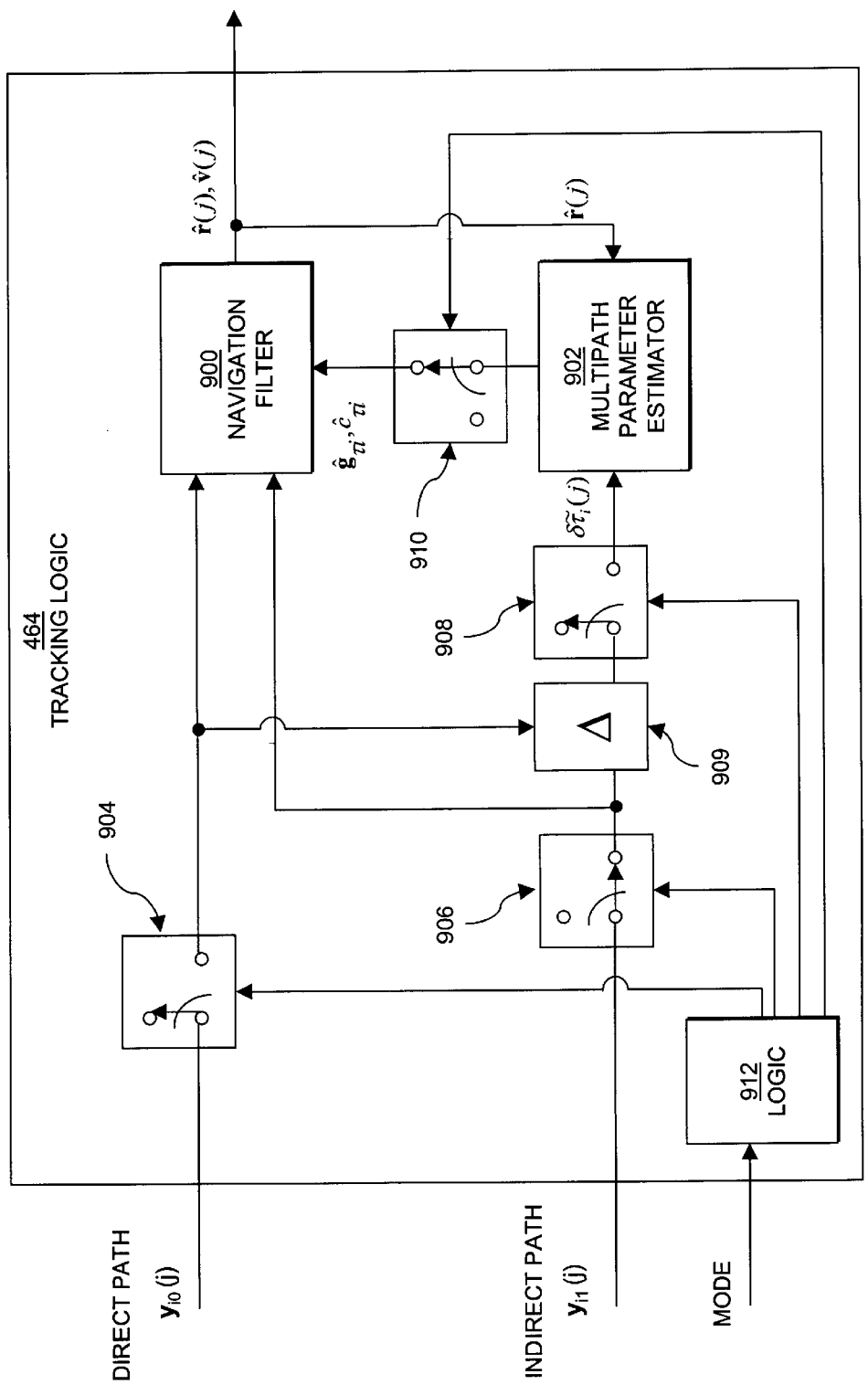
FIG. 9C is a block diagram of tracking logic configured in a third mode and relating to the embodiment of the invention shown in FIG. 7.

In general, the tracking logic 464 is configurable in three different operational modes as shown in FIGS. 9A through 9C. The logic 912 determines the appropriate mode at each time "j" during the navigation process and controls the switches 904, 906, 908 as required to operate in the desired mode. The logic 912 receives an indication of the mode and in response to this indication, controls the switches 904, 906, 908 to configure the tracking logic 464 to the desired mode. In one embodiment, the mode input is provided by sensors sensing the received direct path and multipath signals. In another embodiment, the mode input is selected by the operator.

Referring to FIG. 9A, one embodiment of the tracking logic 464 is shown with the switches 904, 906, 908 configured in a first mode using both the direct path and the multipath. In this configuration, the navigation filter 900 receives the direct path, and the indirect path, and the multipath parameter estimator is employed to estimate the multipath parameters based on the delay difference.

Referring to FIG. 9B, one embodiment of the tracking logic 464 is shown with the switches 904, 906, 908 configured in a second mode using the direct path but not the indirect path. In this configuration, the navigation filter 900 receives the direct path only, and the multipath parameter estimator 902 is not used. For embodiments in which the multipath parameter estimator 902 continues to operate, the fourth switch 910 can be used to isolate the multipath parameters from the navigation filter 900.

Referring to FIG. 9C, one embodiment of the tracking logic 464 is shown with the switches 904, 906, 908 configured in a third mode using multipath only. In this configuration, the navigation filter 900 receives the indirect path, but not the direct path, and the multipath parameter estimates are employed to calculate the navigation solution.

Although, for navigation purposes using GPS, a minimum of seven states (three components of receiver position and velocity and receiver clock bias) is typically employed, additional states may be added, as required, to account for uncertain parameters such as satellite clock and ephemeris errors, inertial sensor errors, propagation effects and measurement errors associated with other types of sensors.

Navigation Filter Description

In one embodiment, the navigation filter 900 includes a recursive estimator (not shown), which operates in two steps: (1) a propagation step, and (2) a measurement updating step. For situations in which a measurement has just been processed at time $t_{j-1}$ current values of a state vector estimate and an estimation error covariance matrix are represented by $\hat{x}(j-1)$ and $\hat{P}(j-1)$, respectively. A caret ($\hat{x}$) is used throughout to denote an estimated quantity just after measurement processing.

Navigation Filter: Propagation

The propagation step uses a state vector dynamic model to propagate the state vector and the estimation error covariance matrix from the current time $t_{j-1}$ to the next measurement time $t_j$. The state vector estimate may be propagated using:

$$x'(j)=f(\hat{x}(j-1),t_j,t_{j-1}) \quad (28)$$

where f is a known differentiable function. A prime (') is used throughout to denote an estimated quantity just prior to measurement updating. The estimation error covariance matrix is similarly propagated from the current time $t_{j-1}$ to the next measurement $t_j$ using $$P'(j)=\Phi(\hat{x}(j-1),t_j,t_{j-1})\hat{P}(j-1)\Phi^T(\hat{x}(j-1),t_j,t_{j-1})+Q(j) \quad (29)$$

where $$\Phi(\hat{x}(j-1),t_j,t_{j-1}) = \left.\frac{\partial f(x,t_j,t_{j-1})}{\partial x}\right|_{x=\hat{x}(j-1)} \quad (30)$$

is an error transition matrix and Q(j) is a matrix that is used to model, for example, the effects of dynamic model uncertainty over the time interval from $t_{j-1}$ to $t_j$. Equations (28) through (30) are representative of models typically used in multivariate estimation.

Navigation Filter: Measurement Updating

In one embodiment, the direct path and indirect path measurements each are processed separately for one satellite at a time. Thus, all measurements processed in the navigation filter are scalars. The vector form of the update equations is similar to the scalar form. The scalar form, however, is generally preferred in practice since it allows data reasonableness tests (e.g., tests for outliers) to be made on each measurement before it is processed in the navigation filter.

Navigation Filter: Updating with Direct Path Measurements

In one embodiment, the receiver clock errors are assumed to be significant. For simplicity of exposition, the clock error is assumed to be a constant bias. More complex clock error dynamics and other correlated measurement errors due to atmospheric effects and satellite ephemeris can be added to the model, if required, using conventional techniques. The direct path measurement from the $i^{th}$ satellite at time $t_j$ is given by:

$$y_{i0}(j)=\tau_{i0}(j)+b_{clk}+n_{i0}(j) \quad (31)$$

where $\tau_{i0}(j)$ is given in equation (20), and $n_{i0}(j)$ is modeled in the navigation filter 900 as zero-mean, independent white noise with known variance N. The a priori measurement estimate is:

$$y'_{i0}(j)=\|s_i(j)-r'(j)\|+b'_{clk}(j)=\tau'_{i0}(j)+b'_{clk}(j) \quad (32)$$

where r'(j) is the a priori receiver position estimate and $b_{clk}'(j)$ is the a priori clock bias estimate. The measurement residual $v_{i0}(j)=\tau_{i0}(j)-\tau_{i0}'(j)$ may be accurately modeled by:

$$v_{i0}(j)=-H_{i0}(j)e'(j)+n_{i0}(j) \quad (33)$$

where e'(j)=x'(j)−x(j) is the a priori state estimation error and $H_{io}(j)$ is the measurement matrix. The form of $H_{io}(j)$ depends on the form of the state vector. In one embodiment, a seven-dimensional state vector is used as shown:

$$x(j)=[r^T(j)\ v^T(j)\ b_{clk}]^T \quad (34)$$

The receiver's velocity vector v(j) includes the $v_x$, $v_y$ and $v_z$ velocity components measured along the coordinate axes. Other embodiments are possible with different state vectors. For the seven-dimensional state vector shown in equation (34), the measurement matrix is given by $$H_{i0}(j)=[-u_{si}^T(j)\ 0\ 0\ 0\ 1]. \quad (35)$$

Updating the state vector and the state error covariance matrix using a direct path measurement follows the usual Kalman filter equations $$\hat{x}(j)=x'(j)+K_{i0}(j)v_{i0}(j),\ \hat{P}(j)=[I-K_{i0}(j)H_{i0}(j)]P'(j) \quad (36)$$

where $$K_{i0}(j) = \frac{P'(j)H_{i0}^T(j)}{H_{i0}(j)P'(j)H_{i0}^T(j)+N} \quad (37)$$

is the Kalman gain matrix.

Navigation Filter: Updating with Indirect Path Measurements

The processing required for each indirect path is described below. Since the processing is the same for each path, only the processing required for one indirect path is described. The indirect path measurement is:

$$y_i(j)=\tau_i(j)+b_{clk}+n_i(j) \quad (38)$$

$$=\tau_{i0}(j)+g_{\tau i}^T(j)r(j)+c_{\tau i}(j)+b_{clk}+n_i(j)$$

where the measurement error $n_i(j)$ is modeled in the navigation filter 900 as zero-mean, independent white noise with known variance N.

The a priori measurement estimate is:

$$y'_i(j)=\tau'_i(j)+b'_{clk}(j) \quad (39)$$

$$=\tau'_{i0}(j)+g'^T_{\tau i}(j)r'(j)+c'_{\tau i}(j)+b'_{clk}(j)$$

$$=y'_{i0}(j)+g'^T_{\tau i}(j)r'(j)+c'_{\tau i}(j)$$

The measurement residual $\upsilon_i(j)=y_i(j)-y'_i(j)$ is $$\upsilon_i(j)=-H_i(j)e'(j)+n_i(j)+\delta n_i(j) \quad (40)$$

where:

$$H_i(j)=[-(u_{si}^T(j)+g'^T_{\tau i}(j))\ 0\ 0\ 0\ 1] \quad (41)$$

$$\delta n_i(j)=-r'^T(j)e'_{g\tau i}(j)-e'_{c\tau i}(j)+e'^T_{g\tau i}(j)e'_r(j) \quad (42)$$

and $e'_{g\tau i}(j)=g'_{\tau i}(j)-g_{\tau i}(j)$ and $e'_{c\tau i}(j)=c'_{\tau i}(j)-c_{\tau i}(j)$ are the a priori multipath parameter estimation errors, whose statistics are calculated in the multipath parameter estimator 902.

The update equations are:

$$\hat{x}(j)=x'(j)+K_i(j)\upsilon_i(j),\ \hat{P}(j)=[I-K_i(j)H_i(j)]P'(j) \quad (43)$$

where:

$$K_i(j) = \frac{P'(j)H_i^T(j)}{H_i(j)P'(j)H_i^T(j)+N+\delta N_i(j)} \quad (44)$$

is the Kalman gain matrix. The scalar $\delta N_i(j)$ is the mean squared value of $\delta n_i(j)$, which can be calculated using equation (42) and the statistics of the position estimation error, which is calculated in the navigation filter 900, and the statistics of the multipath parameter estimation errors, which are calculated in the multipath parameter estimator 902.

Multipath Parameter Estimator

The multipath parameter estimator 902 operates during periods when signals from both the direct and an indirect path from the same satellite are received. The multipath parameters are different for each satellite and for each indirect path and are estimated separately.

Multipath Estimator: Measurement Updating

The design of the multipath parameter estimator 902 takes advantage of the bilinear form of the differential delays as shown in equation (22) and also assumes that the most significant uncertainty arises from poor knowledge of the multipath parameters. With this assumption, the measurements used by the multipath parameter estimator 902 are of the form:

$$\delta\tau_i(j)=y_i(j)-y_{i0}(j) \quad (45)$$

$$r^T(j)g_{\tau i}(j)+c_{\tau i}(j)+n_i(j)-n_{i0}(j)$$

$$=\hat{r}^T(j)g_{\tau i}(j)+c_{\tau i}(j)+n_{\tau i}(j)$$

where:

$$n_{\tau i}(j)=g_{\tau i}^T(j)e_r(j)+n_i(j)-n_{i0}(j) \quad (46)$$

and the position error $e_r(j)=\hat{r}(j)-r(j)$ is presumed to be small enough so that the term $g_{\tau i}^T(j)e_r(j)$ does not dominate $n_{\tau i}(j)$.

Presuming that differential delay measurements are available from n indirect paths, the state vector is made up of n 4-dimensional state vectors, $$x_{\tau i}(j) = \begin{bmatrix} g_{\tau i}(j) \\ c_{\tau i}(j) \end{bmatrix}, \quad i=1,2,\ldots,n \quad (47)$$

The state vectors are updated independently using the associated differential delay measurements. From equation (45), the measured differential delay for the $i^{th}$ indirect path is given by $$\delta\tau_{96\ i}(j)=H_{\tau i}(j)x_{\tau i}(j)+n_{\tau i}(j) \quad (48)$$

where $H_{\tau i}(j)=[\hat{r}^T(j)\ 1]$ is the known measurement matrix. The a priori measurement estimate is $$\delta\tau'_{96\ i}(j)=H_{\tau i}(j)x'_{\tau i}(j) \quad (49)$$

The state vector estimate and error covariance matrix estimates are updated using the usual Kalman filter update equations:

$$\hat{x}_{\tau i}(j)=x'_{\tau i}(j)+K_{\tau i}(j)\upsilon_{\tau i}(j),\ \hat{P}_{\tau i}(j)=[I-K_{\tau i}(j)H_{\tau i}(j)]P'_{\tau i}(j) \quad (50)$$

where $\upsilon_{\tau i}(j)=\delta\tau_{\tau i}(j)-\delta\tau'_{96\ i}(j)$ is the measurement residual and $$K_{\tau i}(j) = \frac{P'_{\tau i}(j)H_{\tau i}^T(j)}{H_{\tau i}(j)P'_{\tau i}(j)H_{\tau i}^T(j)+N_{\tau i}(j)} \quad (51)$$

is the Kalman gain matrix and $N_{\tau i}(j)$ is the mean squared value of $n_{\tau i}(j)$. The effect of navigation position errors in the navigation filter 900 can be approximately accounted for by including them in the statistical measurement noise model.

Multipath Parameter Estimator: Propagation

The components of each state vector will generally vary slowly in accordance with the slow variation of the unit vectors to the satellites in view. If the interval during which a direct/indirect path pair is jointly visible is no more than several minutes, then there is no significant change in the values of the multipath parameters and they can be modeled as constants in the multipath parameter estimator 902. If this interval is on the order of tens of minutes or more, then it may be appropriate to account for a small variation in the parameter values. This can be done, for example, by assuming that the parameters undergo a random walk process; in this case, the state vectors and associated state estimation error covariance matrices are propagated in the estimator using $$x'_{\tau i}(j)=\hat{x}_{\tau i}(j-1),\ P'_{\tau i}(j)=\hat{P}_{\tau i}(j-1)+Q_{\tau i}(j);\ i=1,2,\ldots,n \quad (52)$$

where $Q_{\tau i}(j)$ is the variance of the random walk process over the propagation interval.

Other Embodiments

Other embodiments are possible where multiple multipath signals may be received, correlated and combined to produce a navigational signal having sufficient amplitude to allow the multipath receiver 440 to navigate, where any one of the signals alone would not have sufficient amplitude.

For example, as is done in rake-configured communication receivers, the signal contributions from the different multipaths and the direct path may be combined to yield an overall signal with a greater amplitude than any of the individual signals, thus increasing the sensitivity and/or noise-immunity of the receiver. The receiver can, through multiple evaluations with different combinations of multipath and direct path signals, estimate the multipath delay.

Still other embodiments are possible in which multiple multipath signals may be received from a nearby wireless source, correlated and combined to produce a navigational signal. The previously described techniques of navigating using wireless multipath signals may be performed using signals from local cell towers, even facilitating navigating within a building or complex using wireless transmissions from a wireless source, such as a source transmitting according to the BLUETOOTH, or 802.11 interoperability standards.

Having shown the preferred embodiments, one skilled in the art will realize that many variations are possible within the scope and spirit of the claimed invention. It is therefor the intention to limit the invention only by the scope of the claims.

What is claimed is:

1. A method of navigating using a multipath wireless signal, the method comprising the steps of:
   providing navigation information indicative of a geographical location;
   receiving a multipath navigation signal;
   relating the multipath signal to the geographical location; and
   navigating using the multipath signal based on the relationship.

2. The method of claim 1 wherein the navigation information is provided by a direct-path wireless navigation signal transmitted from a wireless source, the relating step comprising determining a relationship between the multipath signal and the direct-path signal.

3. The method of claim 2 wherein at least one of the multipath signal and the direct-path signal is of insufficient strength to permit navigation based thereon, the navigation step comprising combining the multipath signal and the direct-path signal to provide a navigation solution.

4. The method of claim 2 wherein the relating step further comprises the step of determining multipath parameters relating the multipath signal to the direct-path signal, the multipath parameters, when processed with the multipath signal, facilitating determination of a current location.

5. The method of claim 4 wherein the multipath parameters are determined according to steps comprising:
   determining a first path delay, corresponding to a direct-path distance to the wireless, source multiplied by a propagation velocity; and
   determining a second path delay, corresponding to a multipath distance to the wireless source, multiplied by the propagation velocity, the multipath parameters being related to the first and the second path delays.

6. The method of claim 5 wherein the step of determining a path delay comprises the steps of:
   Time shifting a replica of a received signal;
   correlating the received signal with the time-shifted replica thereof; and
   determining a time-shift value resulting in a relative maximum correlation of the received signal with the time-shifted stored representation of the received signal.

7. The method of claim 2 wherein the direct-path wireless navigation signal is transmitted according to a wireless network protocol.

8. The method of claim 7 wherein the wireless network protocol is a Bluetooth protocol.

9. The method of claim 1 wherein the navigation information is provided by a direct-path wireless navigation signal transmitted from a wireless source, the relating step comprising shifting the direct-path signal and correlating the shifted direct-path signal with the multipath signal.

10. The method of claim 1 wherein the navigation information is provided by a known starting location and an estimation of a current location based on the starting location.

11. The method of claim 1 wherein the navigation information comprises general location information.

12. The method of claim 1 wherein the wireless multipath signal is generated by a Global Positioning System (GPS) transmitter.

13. An apparatus for navigating using a multipath wireless signal, the apparatus comprising:
    circuitry for providing a geographical location;
    a receiver receiving a wireless multipath navigation signal;
    circuitry for relating the multipath signal to the geographical location; and
    circuitry for navigating using the multipath signal based on the relationship.

14. The apparatus of claim 13 wherein the receiver comprises circuitry configured to receive a spread-spectrum signal.

15. The apparatus of claim 14 wherein the spread-spectrum signal is a code-division-multiple-access (CDMA) signal.

16. The apparatus of claim 13 wherein the receiver is configured to receive the wireless multipath signal from a GPS transmitter.

17. The apparatus of claim 13 wherein the relating circuitry comprises a correlator interactive with the geographical location circuitry and the receiver, the correlator providing an output indicative of a relationship between the geographical location and the received wireless multipath navigation signal.

18. The apparatus of claim 17 wherein the correlator is part of a tracking loop filter.

19. The apparatus of claim 13 further comprising a storage element for storing a representation of the multipath navigation signal.

20. The apparatus of claim 13 wherein the navigating circuitry comprises a processor in communication with the relating circuitry, the processor (i) processing a relating-circuitry output relating the multipath navigation signal to the geographic location and (ii) determining a current location using the wireless multipath navigation signal based on the relationship.

21. The apparatus of claim 13 wherein the navigation information is provided by a direct-path wireless navigation signal transmitted from a wireless source, the receiver being configured to receive the direct-path wireless navigation signal.

22. The apparatus of claim 21 wherein the relating circuitry establishes a relationship between the received multipath signal with the received direct-path signal.

23. The apparatus of claim 22 wherein the relating circuitry determines multipath parameters relating the multipath signal to the direct-path signal, the multipath parameters, when processed with the multipath signal, facilitating determination of a current location.

24. The apparatus of claim 23 wherein the relating circuitry comprises a rake filter.

25. The apparatus of claim 23 wherein the relating circuitry comprises:
  circuitry for determining a first path delay corresponding to a direct-path distance to the wireless source multiplied by a propagation velocity; and
  circuitry for determining a second path delay corresponding to a multipath distance to the wireless source multiplied by the propagation velocity,
  the multipath parameters relating the first path delay to the second path delay.

26. The apparatus of claim 25 wherein the circuitry for determining the first and second path delays comprises:
  circuitry for time shifting a stored representation of a received signal;
  circuitry for correlating the received signal with the time-shifted stored representation thereof; and
  circuitry for determining a time-shift value corresponding to a relative maximum correlation of the received signal with the time-shifted stored representation of the received signal.

27. The apparatus of claim 26 wherein the time-shifting circuitry comprises a delay device providing a delayed output.

28. The apparatus of claim 27 wherein the delay device comprises a tapped-delay line.

29. The apparatus of claim 27 wherein the delay device comprises a shift register.

30. The apparatus of claim 21 wherein at least one of the multipath signal and the direct-path signal is of insufficient strength to permit navigation based thereon, the navigation circuitry comprising circuitry for combining the received multipath signal and the received direct-path signal to provide a navigation solution.

31. The apparatus of claim 13 wherein the geographical-location circuitry determines the geographical location from a known starting location and an estimation of a current location based on the starting location.

* * * * *